(12) United States Patent
Yamamoto et al.

(10) Patent No.: US 9,138,642 B2
(45) Date of Patent: Sep. 22, 2015

(54) DATA GENERATION SYSTEM, DATE GENERATION METHOD, AND A NON-TRANSITORY STORAGE MEDIUM STORING A COMPUTER PROGRAM CONFIGURED TO GENERATE SEQUENCE DATA THAT DESCRIBES REFERENCE TIMING IN A GAME

(75) Inventors: Takao Yamamoto, Tokyo (JP);
Masahiro Kiyomoto, Tokyo (JP);
Yoshitaka Nishimura, Tokyo (JP);
Shota Katagiri, Tokyo (JP)

(73) Assignee: KONAMI DIGITAL ENTERTAINMENT CO., LTD., Minato-Ku, Tokyo (JP)

(*) Notice: Subject to any disclaimer, the term of this patent is extended or adjusted under 35 U.S.C. 154(b) by 251 days.

(21) Appl. No.: 13/643,526

(22) PCT Filed: Apr. 27, 2011

(86) PCT No.: PCT/JP2011/060321
§ 371 (c)(1),
(2), (4) Date: Oct. 25, 2012

(87) PCT Pub. No.: WO2011/136300
PCT Pub. Date: Nov. 3, 2011

(65) Prior Publication Data
US 2013/0053143 A1    Feb. 28, 2013

(30) Foreign Application Priority Data
Apr. 28, 2010   (JP) ................................ 2010-104544

(51) Int. Cl.
*A63F 13/10*       (2006.01)
*A63F 13/40*       (2014.01)

(52) U.S. Cl.
CPC ......... *A63F 13/10* (2013.01); *A63F 2300/1075* (2013.01); *A63F 2300/646* (2013.01); *A63F 2300/8011* (2013.01); *A63F 2300/8047* (2013.01)

(58) Field of Classification Search
CPC .............. A63F 13/10; A63F 2300/646; A63F 2300/1075; A63F 2300/8011; A63F 2300/8047
USPC ....................................... 463/1, 31
See application file for complete search history.

(56) References Cited

FOREIGN PATENT DOCUMENTS

| CN | 1242247 A | 1/2000 |
|---|---|---|
| CN | 1919289 A | 2/2007 |

(Continued)

OTHER PUBLICATIONS

Chinese Office Action with English Translation—Issued Jun. 26, 2013.

(Continued)

*Primary Examiner* — Corbett B Coburn
(74) *Attorney, Agent, or Firm* — Howard & Howard Attorneys PLLC

(57) ABSTRACT

The disclosed data generation system is provided with a monitor for displaying a game area and a touch panel, wherein in a game for displaying two operation reference units and an object which moves therebetween upon the game area, sequence data used as data for designating an operation time period for touch-operation and operation reference units are generated. The data generation system displays, upon a display unit, an editing screen including a time period information display area for displaying information of all operation time periods chronologically and a criteria unit designation area for displaying information of operation time periods of each of the operation reference units chronologically, and for displaying, upon a criteria unit designation area, information for associating information of each of the objects corresponding to each operation time period with information of the operation reference unit where display of each of the objects is started.

14 Claims, 14 Drawing Sheets

(56) References Cited

FOREIGN PATENT DOCUMENTS

| CN | 1919389 A | 2/2007 |
| JP | 2000-155543 A | 6/2000 |
| JP | 2003-236243 A | 8/2003 |
| JP | 3577273 B2 | 10/2004 |

OTHER PUBLICATIONS

International Search Report (date of mailing Jul. 12, 2011).
Korean Office Action with English Translation—Issued Jan. 13, 2014.

DATA GENERATION SYSTEM, DATE GENERATION METHOD, AND A NON-TRANSITORY STORAGE MEDIUM STORING A COMPUTER PROGRAM CONFIGURED TO GENERATE SEQUENCE DATA THAT DESCRIBES REFERENCE TIMING IN A GAME

CROSS REFERENCE TO RELATED APPLICATION

This application is a national stage application of PCT/JP2011/060321, filed Apr. 27, 2011, which claims priority to Japanese Patent Application No. 2010-104544, filed Apr. 28, 2010, the disclosures of which are hereby incorporated by reference in their entirety.

TECHNICAL FIELD

The present invention relates to a data generation system that generates sequence data used as data indicating a reference timing and an operating unit in a game system in which a reference timing of an operating unit provided in an input device is indicated to a player, and a data generation method and a storage medium storing a computer program thereof.

BACKGROUND ART

There are game machines in which a plurality of players alternately operates an operating unit in tune with a rhythm of music. Of the game machines, there has been known a game machine in which a plurality of players plays a game, and each player alternately operates an operating unit while deciding a next player to operate an operating unit through an operation of an operating unit (for example, see Patent Literature 1). Further, there has been known a game machine in which a game is played such that two players alternately hit back an object indicating an operation timing, and the velocity of an object moving toward the other party side changes according to the position of an object at a point in time when each player hits an object back (for example, see Patent Literature 2).

Patent Literature 1: Japanese Patent Application Laid-Open (JP-A) No. 2003-236243 and Patent Literature 2: JP-A No. 2000-155543.

SUMMARY OF INVENTION

Technical Problem

In the game machine disclosed in Patent Literature 1, a difference between an entering timing at which a light shot serving as an operation indication mark indicating an operation of an operating unit enters a control area of each player and a reference timing of each player is evaluated. In the game machine disclosed in Patent Literature 1, a back ground music (BGM) is mainly used as a playing time. Further, in the game machine disclosed in Patent Literature 2, an operation performed in tune with a rhythm of music is evaluated, but a time on music is not associated with an arrival timing of an object serving as an operation indication mark. Meanwhile, in a game in which a reference timing of each player is indicated according to a time on music, sequence data in which a reference timing of each player is associated with a time on music is necessary. And, when such sequence data is generated, understanding of the flow of indication mark on the game improves generation efficiency of sequence data.

In this regard, it is an object of the present invention to provide a data generation system capable of improving generation efficiency of sequence data, and a data generation method and a storage medium storing a computer program thereof.

Solution to Problem

A data generation system of the present invention is a data generation system generating sequence data, in which a reference timing in a game is described, which is used by being referred to by a computer as information indicating the reference timing of a game in which an operation indication mark displayed for indicating an operation on at least one operating unit to be operated by a player moves so as to arrive at least one of a plurality of reference portions at the reference timing in a game region in which the plurality of reference portions are arranged apart from each other, wherein the data generation system comprises: a display unit that displays an editing screen; an editing area presenting device that causes a timing information display region displaying information of all reference timings in time series and a reference portion indication region displaying reference timings assigned to at least one of the plurality of reference portions among the all reference timings in time series for each reference portion to be displayed on the editing screen; and an information presenting device that causes display start position information in which information of an operation indication mark corresponding to each reference timing assigned for each reference portion is associated with information of each reference portion in which each operation indication mark starts to be displayed on the reference portion indication region.

According to the present invention, since it is possible to check each reference timing assigned to each reference portion region while checking all reference timings executed in the game, a difficulty level of the game can be easily understood. Furthermore, there is displayed information in which information of an operation indication mark indicating each reference timing is associated with information of a reference portion in which the operation indication mark starts to be displayed, and thus the flow of movement of the operation indication mark can be easily understood. As a result, the generation efficiency of sequence data can be improved.

In an aspect of the data generation system of the present invention, the information presenting device may further cause display start timing information in which information of the operation indication mark corresponding to each reference timing assigned for each reference portion is associated with information of a display start timing at which each operation indication mark starts to be displayed to be displayed on the reference portion indication region. In this case, further, a timing at which each operation indication mark starts to be displayed can be understood, and thus the generation efficiency of sequence data can be further improved.

Various kinds of information may be used as the display start position information and the display start timing information. For example, in an aspect of the data generation system of the present invention, the information presenting device may display a connecting line which is provided for each operation indication mark corresponding to each reference timing assigned for each reference portion on the reference portion indication region, and connects reference timings with each other such that a reference timing positioned at a starting point corresponds to information representing a display start timing and a reference portion to which the reference timing is assigned corresponds to information representing a reference portion that starts to be displayed, as the display start position information and the display start timing information. In this case, since the connecting line extends from a display start position and a display start timing of the operation indication mark to the reference timing of an indication target, it is possible to imagine the moving direction. Thus, the flow of the movement of the operation indication mark can be easily understood.

Further, in the aspect in which the connecting line is displayed as the display start position information and the display start timing information, the information presenting device may cause the connecting line to be displayed in a color that differs according to a reference portion to which a reference timing serving as a starting point is assigned based on the display start position information. In this case, the flow of the movement of the operation indication mark can be understood by the color of the connecting line.

In an aspect of the data generation system of the present invention, the sequence data may be described such that a reference timing of each of a series of operations on a plurality of operating units described as the reference timing is associated with information designating any one of the plurality of operating units, and used as a data indicating the reference timing and each operating unit in the game in which a region in which each reference portion corresponding to each of the plurality of operating units among the plurality of reference portions is set as an operation reference portion is used as the game region, the editing area presenting device may cause information of all reference timings respectively corresponding to the plurality of operating units to be displayed on the timing information display region in time series, and may cause each reference timing assigned to each of the plurality of operating units to be displayed on the reference portion indication region in time series for each operation reference portion, and the information presenting device may cause information in which information of an operation indication mark corresponding to each reference timing assigned for each operation reference portion is associated with information of each operation reference portion in which each operation indication mark starts to be displayed to be displayed on the reference portion indication region as the display start position information. In this case, the generation efficiency of sequence data used for a game using a plurality of operation reference portions can be improved.

In an aspect of the data generation system of the present invention, the data generation system may further comprises an assignment device that assigns information of all reference timings displayed on the timing information display region for each reference portion of the reference portion indication region. In this case, a process of assigning each of all reference timings to each operating unit can be reduced.

In an aspect of the data generation system of the present invention, the data generation system may further comprises: an operation input unit that receives a user's operation; and an editing device that edits information to be displayed on the editing screen based on information of an operation on the operation input unit. In this case, editing can be performed with understanding of a difficulty level of a game and the flow of the movement of the operation indication mark, and thus editing efficiency can be improved.

Further, in an aspect in which the editing device is provided, a the reference timing setting device that sets a mark timing based on information input to the operation input unit, calculates a timing at which an operation has been executed on the operation input unit as an elapsed timing from the mark timing, and sets the calculated elapsed timing as the reference timing may be provided as one of editing devices. In this case, information of all reference timings can be generated based on an operation on the operation input unit.

The editing device may have various functions. For example, in an aspect of the present invention, an information determining device that determines at least one of information of each reference timing displayed on the editing screen based on information input to the operation input unit may be provided as one of the editing devices. In this case, various kinds of edits can be performed on the determined information. Further, in this aspect, a reference portion information adding device that adds information of a reference portion corresponding to any one of the plurality of reference portions to information of the reference timing determined by the information determining device may be provided as one of editing devices. In this case, editing of assigning each of all reference timings to each reference portion can be performed. Further, in the aspect in which the information determining device is provided, an timing information adding device that adds information of one of two reference timings determined by the information determining device to information of the other reference timing based on information input to the operation input unit may be provided as one of editing devices. In this case, editing of associating one reference timing with the other reference timing can be performed.

In an aspect of the data generation system of the present invention, the data generation system may further comprises a grouping device that performs grouping by specifying one of reference timings and a next reference timing next to the one reference timing in which a time interval between the one reference timing and the next reference timing is less than a predetermined value, and adding common information to the specified one reference timing and the next reference timing. In this case, editing on each reference timing having a short reference time interval can be easily performed.

In an aspect of the data generation system of the present invention, the data generation system may further comprises a generating device that generates the sequence data based on information to be displayed on the reference portion indication region. In this case, the sequence data can be generated based on information to be displayed on the editing screen.

A data generation method of the present invention is a data generation method for controlling a computer incorporated into a data generation system generating sequence data, in which a reference timing in a game is described, which is used by being referred to by a computer as information indicating the reference timing of a game in which an operation indication mark displayed for indicating an operation on at least one operating unit to be operated by a player moves so as to arrive at least one of a plurality of reference portions at the reference timing in a game region in which the plurality of reference portions are arranged apart from each other, wherein the data generation system comprises a display unit that displays an editing screen, and the data generation method comprises the steps: an editing area presenting step that causes a timing information display region displaying information of all reference timings in time series and a reference portion indication region displaying reference timings assigned to at least one of the plurality of reference portions among the all reference timings in time series for each reference portion to be displayed on the editing screen; and an information presenting step that causes display start position information in which information of an operation indication mark corresponding to each reference timing assigned for each reference portion is associated with information of each reference portion in which each operation indication mark starts to be displayed on the reference portion indication region.

Further, a storage medium storing a computer program of the present invention is a storage medium storing a computer program for a data generation system generating sequence data, in which a reference timing in a game is described, which is used by being referred to by a computer as information indicating the reference timing of a game in which an operation indication mark displayed for indicating an operation on at least one operating unit to be operated by a player moves so as to arrive at least one of a plurality of reference portions at the reference timing in a game region in which the plurality of reference portions are arranged apart from each other, wherein the data generation system comprises a display unit that displays an editing screen, and the computer program for the data generation system is configured so as to cause a computer incorporated into the data generation system to function as: an editing area presenting device that causes a timing information display region displaying information of all reference timings in time series and a reference portion indication region displaying reference timings assigned to at least one of the plurality of reference portions among the all reference timings in time series for each reference portion to be displayed on the editing screen; and an information presenting device that causes display start position information in which information of an operation indication mark corresponding to each reference timing assigned for each reference portion is associated with information of each reference portion in which each operation indication mark starts to be displayed on the reference portion indication region. It is possible to actualize a data generation system of the present invention by executing the computer program or the data generation method of the present invention.

Advantageous Effects of Invention

As described above, according to the present invention, the generation efficiency of sequence data can be improved.

DESCRIPTION OF EMBODIMENTS

Figure 1:
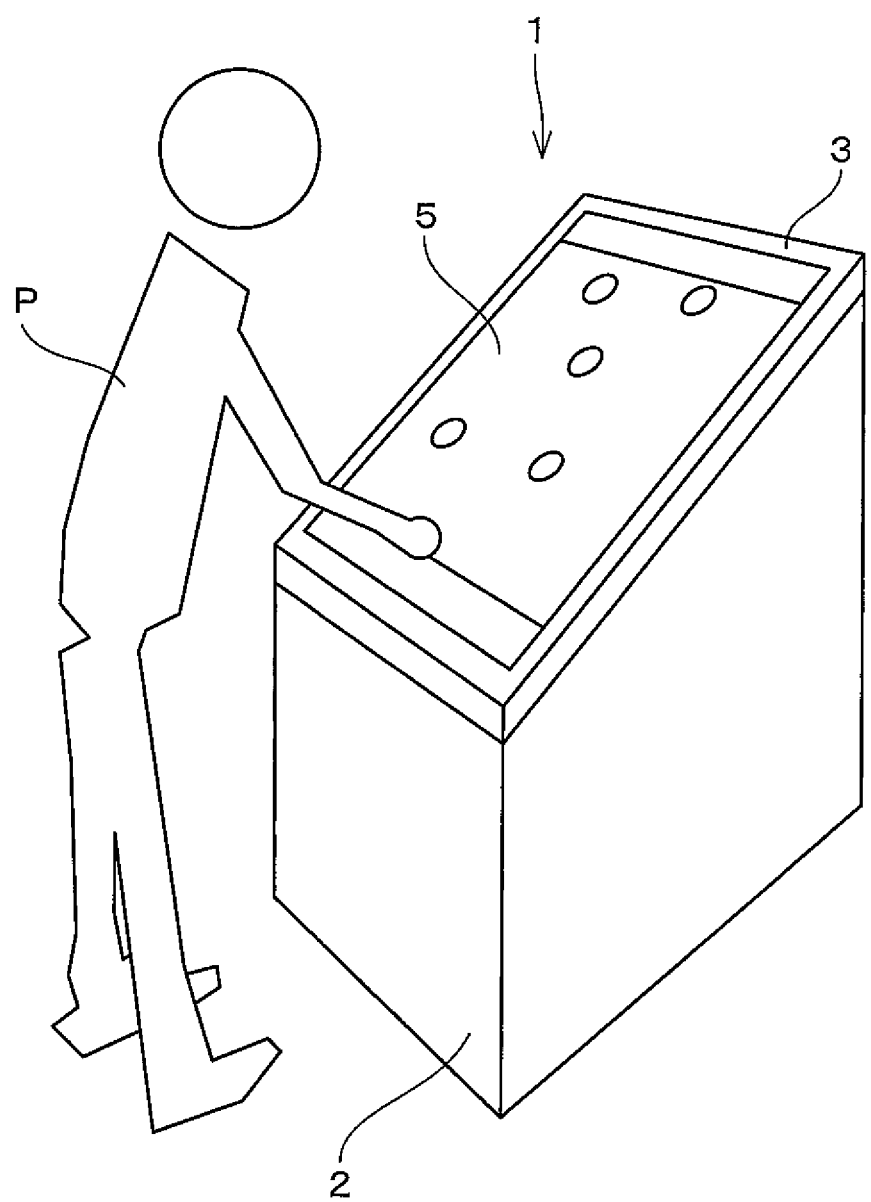
FIG. 1 is a diagram illustrating an example of a game machine in which a game is executed according to an embodiment of the present invention.

Hereinafter, an embodiment of a game machine in which a game is executed according to the present invention will be described. FIG. 1 is a diagram illustrating a game machine for business use in which a game is executed according to an embodiment of the present invention. As illustrated in FIG. 1, a game machine 1 includes a casing 2, and a monitor 3 arranged, obliquely toward a player P side, on the top surface of the casing 2. A transparent touch panel 5 is superimposed on the surface of the monitor 3. The touch panel 5 is a known input device that outputs a signal corresponding to a contact position when the player P contacts the touch panel 5 with his/her finger or the like. In addition, the game machine 1 includes various kinds of input devices and output devices provided in a typical game machine for business use such as a button used to make a selection or a decision, a power switch, a volume operation switch, and a power lamp, which are not illustrated in FIG. 1.

Figure 2:
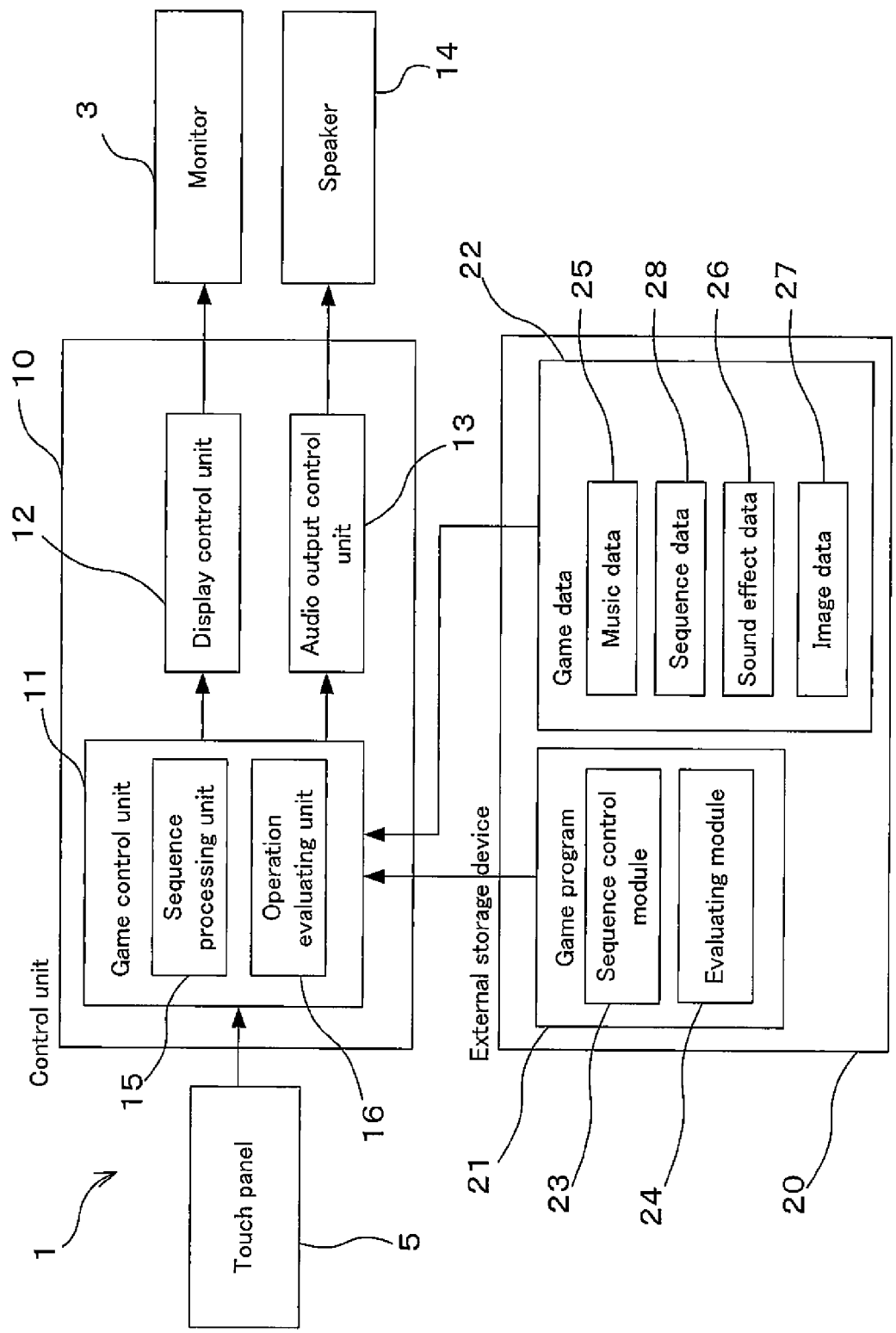
FIG. 2 is a functional block diagram of a game machine.

FIG. 2 is a functional block diagram of the game machine 1. As illustrated in FIG. 2, a control unit 10 serving as a computer is provided in the casing 2. The control unit 10 includes a game control unit 11 serving as a control host, a display control unit 12 and an audio output control unit 13 which operate according to an output from the game control unit 11. The game control unit 11 is configured as a unit in which a microprocessor is combined with various kinds of peripheral devices such as an internal storage device (for example, a read only memory (ROM) or a random access memory (RAM)) necessary for an operation of the microprocessor. The display control unit 12 causes a predetermined image to be displayed on the monitor 3 by rendering an image corresponding to image data provided from the game control unit 11 in a frame buffer and then outputting a video signal corresponding to the rendered image to the monitor 3. The audio output control unit 13 causes a predetermined sound (including music or the like) to be reproduced from a speaker 14 by generating an audio reproduction signal corresponding to audio reproduction data provided from the game control unit 11 and then outputting the generated audio reproduction signal to the speaker 14.

The game control unit 11 is connected with an external storage device 20. As the external storage device 20, there is used a storage medium in which data remains stored even when power is not supplied such as an optical storage medium including a digital versatile disc-read only memory (DVD-ROM), a compact disc-read only memory (CD-ROM) or the like, or a non-volatile semiconductor memory device including an electrically erasable programmable read-only memory (EEPROM).

A game program 21 and game data 22 are stored in the external storage device 20. The game program 21 is a computer program necessary for the game machine 1 to execute a music game according to a predetermined procedure, and includes a sequence control module 23 and an evaluating module 24 in order to actualize a function according to the present invention. When the game machine 1 is activated, the game control unit 11 executes various kinds of initial settings necessary to operate as the game machine 1 by executing an operation program stored in an internal storage device thereof, and then sets an environment in which a music game is executed according to the game program 21 by reading the game program 21 from the external storage device 20 and then executing the game program 21. When the sequence control module 23 of the game program 21 is executed by the game control unit 11, a sequence processing unit 15 is generated in the game control unit 11. Further, when the evaluating module 24 of the game program 21 is executed by the game control unit 11, an operation evaluating unit 16 is generated in the game control unit 11. The sequence processing unit 15 and the operation evaluating unit 16 are logical devices actualized by a combination of computer hardware and a computer program. The sequence processing unit 15 executes a music game processes such as a process of instructing the player to make an operation in tune with reproduction of music (music composition) selected by the player or generating a sound effect in response to the player's operation. The operation evaluating unit 16 executes processes such as a process of evaluating the player's operation and then controlling the game based on an evaluation result. Incidentally, the game program 21 includes various kinds of program modules necessary to execute a music game in addition to the modules 23 and 24, and logical devices corresponding to the modules are generated in the game control unit 11 although not illustrated.

The game data 22 includes various pieces of data to be referred to when a music game is executed according to the game program 21. For example, the game data 22 includes music data 25, sound effect data 26, and the image data 27. The music data 25 refers to data necessary for reproducing and outputting music which is a target of the game from the speaker 14. FIG. 2 illustrates a single kind of music data 25, but the player can actually select music to be played from among a plurality of pieces of music. In the game data 22, one or more pieces of music data 25 are recorded in association with information identifying each music. The sound effect data 26 is data in which each of one or more types of sound effects to be output from the speaker 14 in response to the player's operation is recorded in association with a unique code. Sounds of musical instruments and various kinds of sounds are included as the sound effect. Pieces of sound effect data which are equal in number to a predetermined octave number and have different musical pitches according to the kind may be prepared. The image data 27 is data used to cause a background image, various kinds of objects or icons, and the like in a game screen to be displayed on the monitor 3.

The game data 22 further includes sequence data 28. The sequence data 28 is data used to define an operation to be indicated to the player. At least a piece of sequence data 28 is prepared for single music data. The details of the sequence data 28 will be described later.

Figure 3:
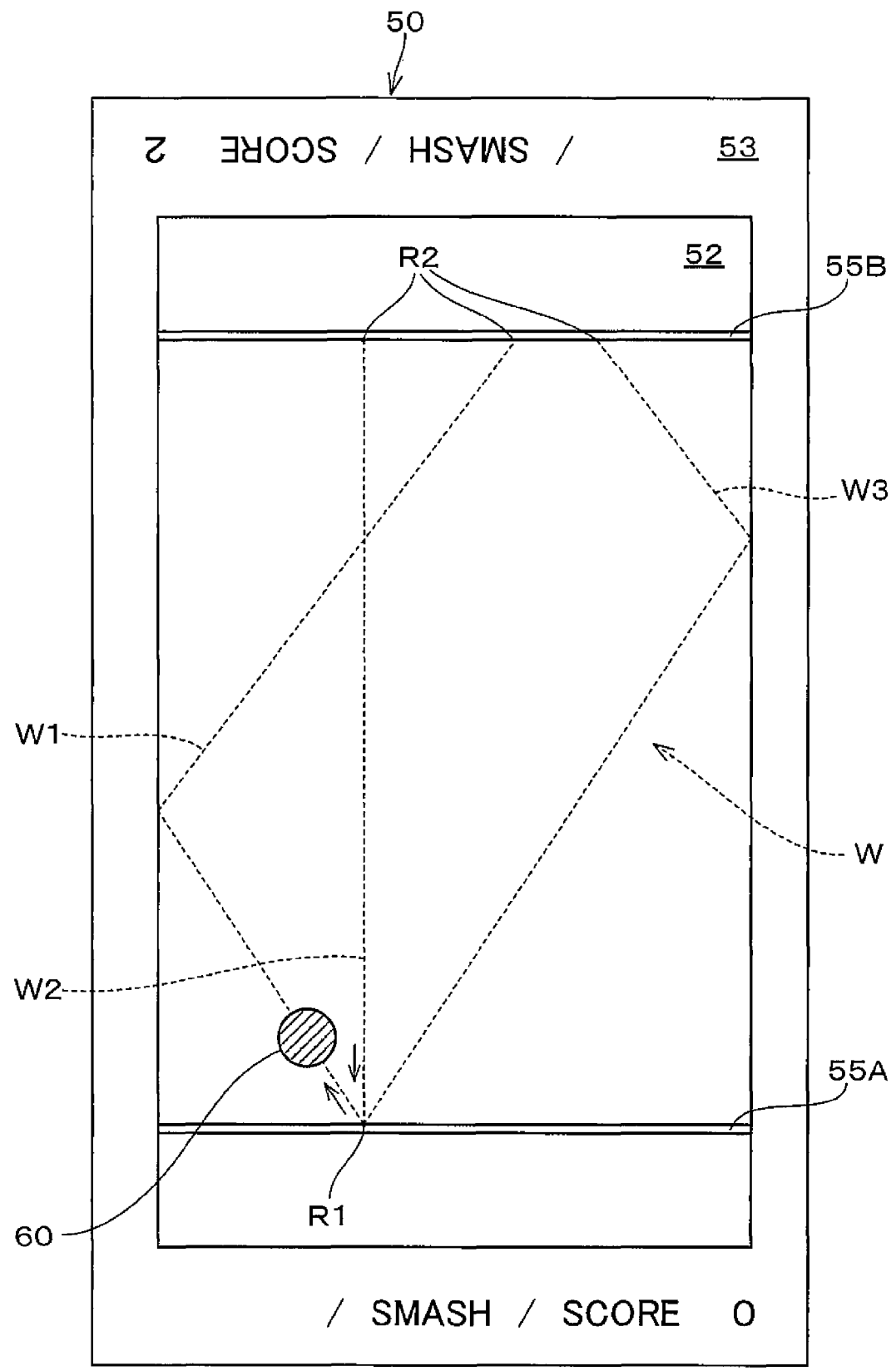
FIG. 3 is a diagram schematically illustrating a game screen.

Next, an outline of a music game executed by the game machine 1 will be described. The game machine 1 is configured as a music game machine of a match-up type in which the two players execute an operation in tune with music (including a case in which the game machine 1 functions as the other player) and operation timings of two players are evaluated. FIG. 1 illustrates only one game machine, but the game may be played through a plurality of game machines 1 connected so as to share the game situation. FIG. 3 is a diagram schematically illustrating a game screen. The game screen 50 includes a game region 52 used to guide an operation timing to the player and an information region 53 used to display a score and the like of each player. The game region 52 has a rectangular shape. A first operation reference portion 55A and a second operation reference portion 55B serving as an operation reference portion are arranged at both ends of the game region 52 in a longitudinal direction so as to face each other. Each of the operation reference portions 55A and 55B extends in the form of a straight line in a direction orthogonal to the longitudinal direction of the game region 52. Each of the operation reference portions 55A and 55B is used as a reference of a current time on the game by a player of the game. Specifically, the first operation reference portion 55A is used as a reference of a current time of a first player, and the second operation reference portion 55B is used as a reference of a current time of a second player. In the example of FIG. 3, a red straight line is used as the first operation reference portion 55A, and a blue straight line is used as the second operation reference portion 55B, and different colors for each player are used for identifying each player. Further, the information region 53 is arranged around the game region 52. One end side of the game region 52 in the longitudinal direction is used for displaying a score and the like of one player, and the other end side thereof is used for displaying a score and the like of the other player.

Each of the operation reference portions 55A and 55B includes a plurality of rebounding points arranged at predetermined intervals. The plurality of rebounding points R1 included in the first operation reference portion 55A are connected with rebounding points R2 included in the second operation reference portion through a plurality of paths W. In other words, provided are a plurality of paths W that reach from one rebounding point R1 included in the first operation reference portion 55A to a plurality of rebounding points R2 included in the second operation reference portion. The three dashed lines illustrated in FIG. 3 represent three paths W1, W2, and W3 all of which connect the rebounding point R1 with the rebounding point R2. In the example of FIG. 3, any one rebounding point R1 of the first operation reference portion 55A has the three paths W1, W2, and W3 that extend from the rebounding point R1 to the three rebounding points R2 included in the second operation reference portion 55B. During execution of the music game, that is, during the progress of reproduction of music, an object 60 serving as the operation indication mark indicating an operation is displayed on the path W connecting the rebounding point R1 with the rebounding point R2 according to the sequence data 28. Incidentally, in FIG. 3, for convenience of description, the paths W1, W2, and W3 are denoted by the dashed lines, but none of the plurality of paths W is displayed on the actual game screen 50.

The object 60 appears at the rebounding point R1 or the rebounding point R2 at an appropriate timing in music, and then moves along the path W extending from the rebounding point R1 or R2 at the appearance position from one of the rebounding points R1 and R2 at the appearance position toward the other of the rebounding points R1 and R2 positioned at the opposite side according to the progress of music. Then, the rebounding point R1 or R2 at which the object 60 has arrived serves as an appearance position of a next object 60, and the next object 60 moves from the appearance position toward the rebounding point R1 or R2 positioned at the opposite side. For this reason, the object 60 alternately rebounds from the rebounding points R1 and R2 and repeatedly moves between the operation reference portions 55A and 55B. Further, each player using the operation reference portion 55A or 55B at which the object 60 has arrived as the reference of the current time is required to perform a touch operation of touching the position of the operation reference portion 55A or 55B at which the object 60 has arrived in tune with an arrival of the object 60 at the operation reference portion 55A or 55B. When each player performs the touch operation, a time difference between a time when the object 60 matches each of the operation reference portions 55A and 55B and a time when each player has performed the touch operation is detected. The smaller the time difference is, the higher an operation of the player is evaluated. Further, a sound effect is reproduced from the speaker 14 in response to the touch operation. A well-known method may be used as the method of reproducing a sound effect. For example, as a well-known method of reproducing a sound effect, there is a method of adding a sound effect on music while reproducing the music or a method of reproducing a sound effect corresponding to a misoperation while muting the music when missed. Further, for example, there is also a method in which music is divided in parts, each part is assigned to each operation timing, and a part of the music assigned to the corresponding operation timing is played back when an appropriate operation is executed (a method of forming the music by an appropriate operation at each operation timing. For this reason, when a misoperation is made, a part of the music to which the operation timing is assigned is not reproduced).

In the example of FIG. 3, the object 60 is moving along the path W1 toward the rebounding point R2 of the second operation reference portion 55B. At this time, it is preferable that the second player using the second operation reference portion 55B as the reference of the current time performs the touch operation at the position of the second operation reference portion 55B at which the object 60 arrives in tune with an arrival at the second operation reference portion 55B. Further, the object 60 is displayed in color corresponding to the operation reference portion 55A or 55B of a destination toward which the object 60 is currently moving. In other words, in the example of FIG. 3, the object 60 is displayed in blue until arriving at the rebounding point R2 of the second operation reference portion 55B, and a next object 60 appearing at the rebounding point R2 at the arrival position is displayed in red. In this embodiment, a plurality of operating units are configured by a combination of each of the operation reference portions 55A and 55B on the monitor 3 and the touch panel 5 superimposed thereon. Incidentally, in the following, each of the operation reference portions 55A and 55B may be used as a term representing the operating unit.

Figure 4:
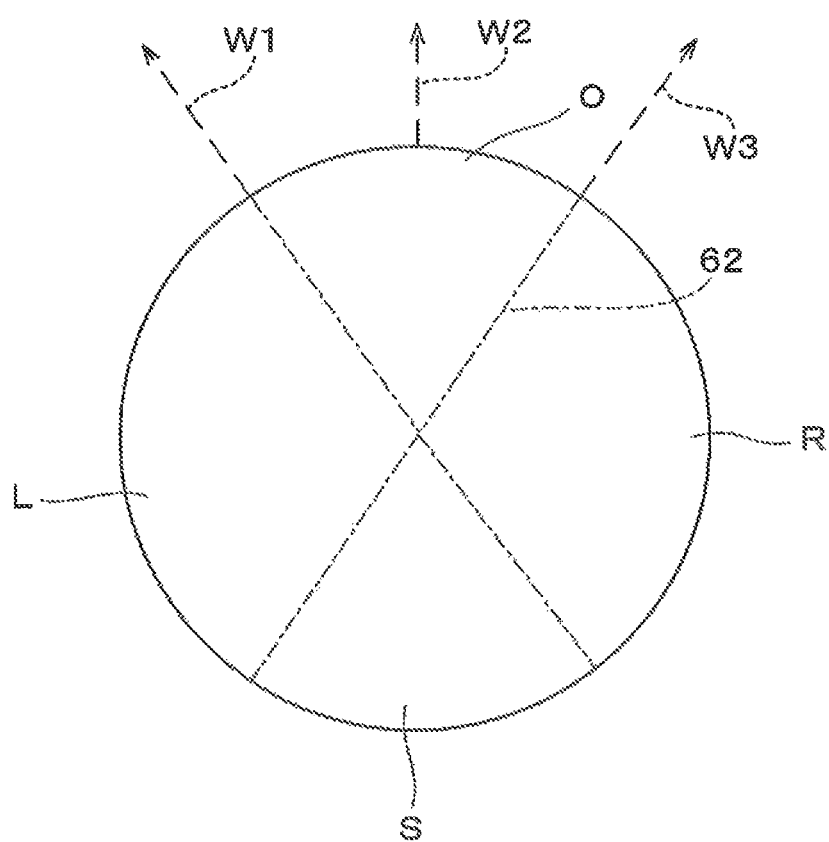
FIG. 4 is a diagram for describing a region of an object.

The path W along which the object 60 moves from one of the rebounding points R1 and R2 at the arrival position to the other of the rebounding points R1 and R2 at the opposite side is decided according to the position of the object 60 when the operation reference portion 55A or 55B is touched. In order to make a comparison of position easy, the object 60 is divided into a plurality of regions. FIG. 4 is a diagram for describing regions of the object 60. In FIG. 4, dashed lines represent the paths W1, W2, and W3, and an alternate long and short dash line 62 represents the boundary between the regions. In the example of FIG. 4, the object 60 is divided into four regions, that is, a contact region S near a contact point at which the object 60 first comes in contact with the operation reference portion 55A or 55B, right and left regions R and L that establish the boundary of the contact region S, and the remaining region. And, as a path along which the object 60 moves, from among the paths W reaching to the rebounding point R1 from the rebounding point R2, the straight line path W2 reaching to R1 at the shortest distance is selected when the contact region S or the remaining region is touched, the first right path W3 reaching to R1 through a right side wall 52R of the game region 52 in the longitudinal direction is selected when the left region L is touched, and the first left path W1 reaching to R1 through a left side wall 52L of the game region 52 in the longitudinal direction is selected. In other words, the moving path used when the object 60 moves to the operation reference portion 55A or 55B of the next destination is decided according to a positional relation between an operation position of the touch operation and the position of the object 60. Since the moving distance differs according to the moving path, the moving distance along which the object 60 moves to the operation reference portion 55A or 55B of the next destination differs according to the positional relation between the operation position and the position of the object 60. Meanwhile, an operation timing to touch the object 60, that is, a timing at which the object 60 arrives at each of the operation reference portions 55A and 55B is constant regardless of the moving path. For this reason, the moving velocity of the object 60 differs according to the moving path. In other words, the path W and the moving velocity of the object 60 that moves toward one player change according to the other player's touch operation. Thus, this changes a difficulty level of a game, and each player executes his/her operation while being conscious of influence on the other player.

Figure 5:
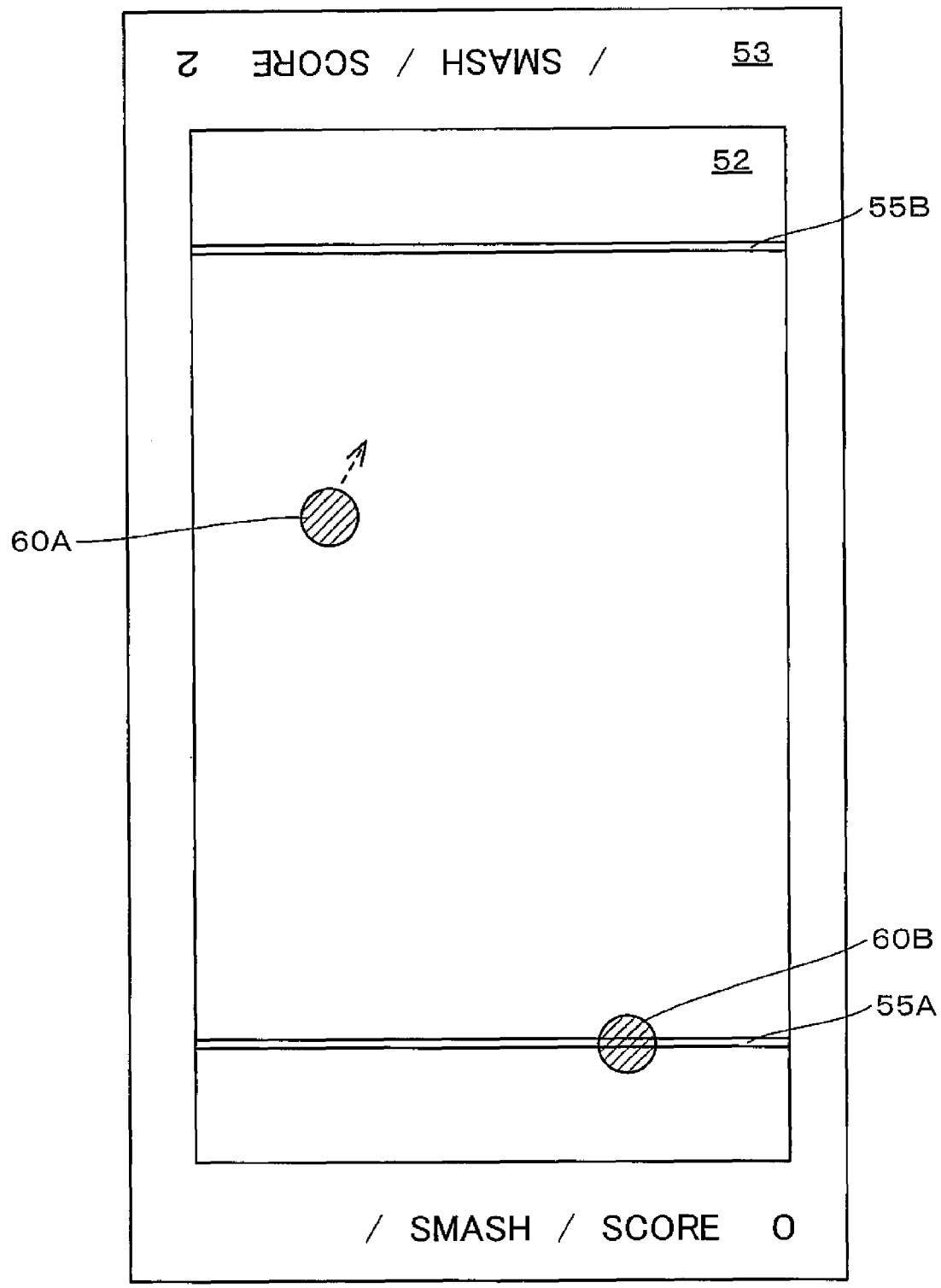
FIG. 5 is a diagram schematically illustrating a game screen of a state in which two objects are displayed on a game region.

A plurality of objects 60 are appropriately displayed on each path W according to a state of the music or the progress state of the game. FIG. 5 is a diagram schematically illustrating a game screen of a state in which two objects 60 are displayed on the game region 52. In the example of FIG. 5, a first object 60A is displayed in front of the second operation reference portion 55B, and a second object 60B is displayed on the first operation reference portion 55A. The objects 60A and 60B move in the game region 52 to arrive at the operation reference portions 55A and 55B at operation timings which are associated with the objects 60A and 60B, respectively, through the sequence data 28 which will be described later. In the following, when the objects 60A and 60B are not distinguished from each other, the objects 60A and 60B are collectively referred to as the object 60.

Figure 6:
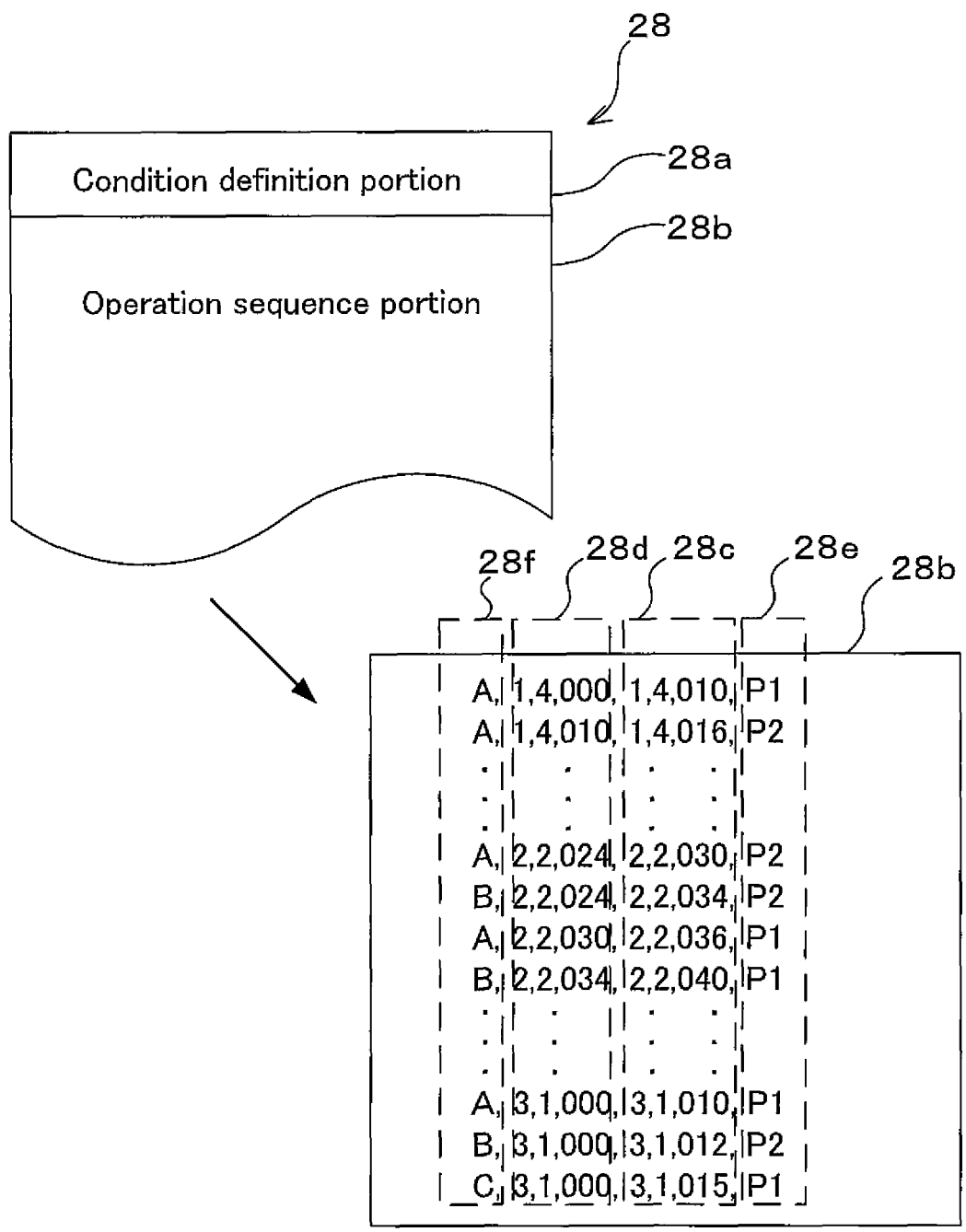
FIG. 6 is a diagram illustrating an example of content of sequence data.

Next, the details of the sequence data 28 will be described with reference to FIG. 6. The sequence data 28 includes a condition definition portion 28a and an operation sequence portion 28b as illustrated in FIG. 6. The condition definition portion 28a includes information described to designate an execution condition of the game that differs according to music, such as information designating the tempo, a beat, and a track of the music, and a sound effect to be generated when the touch operation is performed on the object 60. Incidentally, in FIG. 6, the condition definition portion 28a is included only in the head portion of the sequence data 28, but the condition definition portion 28a may be added to an appropriate intermediate position of the operation sequence portion 28b. Thus, processing of changing the tempo in the music, an assignment of the sound effect, or the like can be actualized.

Meanwhile, in the operation sequence portion 28b, a timing to touch the object 60, a display start timing, and information indicating a player (or each of the operation reference portions 55A and 55B) are described in association with one another for each object 60. FIG. 6 is a diagram illustrating an example of content of the sequence data. As partially illustrated in FIG. 6, the operation sequence portion 28b includes an operation timing portion 28c that indicates a timing (operation timing) to make an operation in music, a display start information portion 28d setting a display start timing to start a display of the object 60, a display position indication portion 28e that indicates a player (or each of the operation reference portions 55A and 55B) in which the object 60 starts to be displayed, and a mark information portion 28f indicating the object 60 to be displayed. And, the operation sequence portion 28b is configured as a set of a plurality of records in which an operation timing to perform an operation in music, a display start timing of the object 60, and a player (or each of the operation reference portions 55A and 55B) in which the object 60 starts to be displayed are described in association with one another for each object 60 to be displayed. The operation timing and the display start timing are described such that a bar number in music, a beat number, and a value representing a time in a beat are separated by a comma. A time in a beat refers to an elapsed time from the head of one beat, and is represented by the number of units, from the head of the one beat, obtained by equally dividing the length of the one beat into n unit times. For example, when a time in which n is 100, and ¼ elapses from the head of a second beat in a second beat of a first bar of music is designated as an operation timing or a display start timing, "01,2,025" is described.

An indication of players in which the object 60 starts to be displayed is described as "P1" when the first player is indicated. And an indication of players in which the object 60 starts to be displayed is described as "P2" when the second player is indicated. Incidentally, the indication of the player corresponds to an indication of a color of the object 60 to be displayed. For example, a blue object 60 is displayed when "P1" is described, and a red object 60 is displayed when "P2" is described.

In the mark information portion 28f, for example, a letter A is described as information indicating the object 60 to be displayed. "A" is used as a letter corresponding to the first object 60 to be displayed on the game region 52, "B" is used as a letter corresponding to the second object 60, and "C" is used as a letter corresponding to the third object 60. In other words, various kinds of letters according to the number of objects 60 to be displayed on the game region 52 are used as information indicating the object 60 to be displayed. Further, information indicating the object 60 represents a correspondence relation between operation timings. Specifically, between operation timings associated with information indicating a common object 60, the position at which the object 60 corresponding to a certain operation timing arrives functions as an appearance position of movement of the object 60 corresponding to another operation timing to which a display start timing closest (or equal) to the certain operation timing is set. Incidentally, when a plurality of records designating the same operation timing are present, the appearance position of the object 60 (the object 60 which will appear next) corresponding to another operation timing may be specified by specifying any one of records designating the same operation timing such as a record which is earlier in a display start timing or a record which is earlier in describing order in which the sequence data 28 is described based on a predetermined specifying condition or the like. Further, information associating the arrival position of each object 60 with the appearance position may be separately described in the sequence data.

In the example of FIG. 6, a display start timing, an operation timing, and an operating player are indicated such that a blue object 60 is displayed on the first operation reference portion 55A which the first player uses as the reference at a start point in time (000) of a fourth beat of a first bar, and the blue object 60 moves along the path W from the first operation reference portion 55A and then arrives at the second operation reference portion 55B at a timing in which "010" elapses from the start point in time of the fourth beat of the first bar. Meanwhile, two objects 60 are displayed on the first operation reference portion 55A at a start point in time (000) of a first beat of a third bar, one objet 60 moves to arrive at the second operation reference portion 55B at a timing in which "010" elapses from the start point in time of the first beat of the third bar, and the other objet 60 moves to arrive at the second operation reference portion 55B at a timing in which "015" elapses from the start point in time of the first beat of the third bar. Furthermore, the object 60 is displayed even at the second operation reference portion 55B at the start point in time (000) of the first beat of the third bar, and the object 60 moves to arrive at the first operation reference portion 55A at a timing in which "012" elapses from the start point in time of the first beat of the third bar. In other words, the three objects 60 are displayed at the start point in time (000) of the first beat of the third bar.

Further, in the example of FIG. 6, a correspondence relation is established between operation timings associated with the same letter "A," "B," or "C." In other words, in the example of FIG. 6, the correspondence relation is indicated such that the arrival position of the object 60 that is displayed on the first operation reference portion 55A at the start point in time (000) of the fourth beat of the first bar and arrives at the second operation reference portion 55B at a timing in which "010" elapses from the start point in time of the fourth beat of the first bar functions as the appearance position of the object 60 that starts to be displayed on the second operation reference portion 55B at a timing in which "010" elapses from the start point in time of the fourth beat of the first bar and moves to arrive at the first operation reference portion 55A at a timing in which "016" elapses from the start point in time of the fourth beat of the first bar. Incidentally, in the example of FIG. 6, for operation timings having the correspondence relation, the same display start timing as each operation timing is set, but a display start timing different from each operation timing may be set. For example, a timing which is slightly earlier than an operation timing corresponding to the object 60 arriving at the appearance position may be set as a display start timing corresponding to each operation timing functioning as the appearance position as far as continuity of the object 60 is maintained. Further, for operation timings having the correspondence relation, an operation timing functioning as the appearance position need not be necessarily set. The object 60 corresponding to an operation timing in which an operation timing functioning as the appearance position is not set, for example, may disappear from the game region 52 since there is no continuity.

Figure 7:
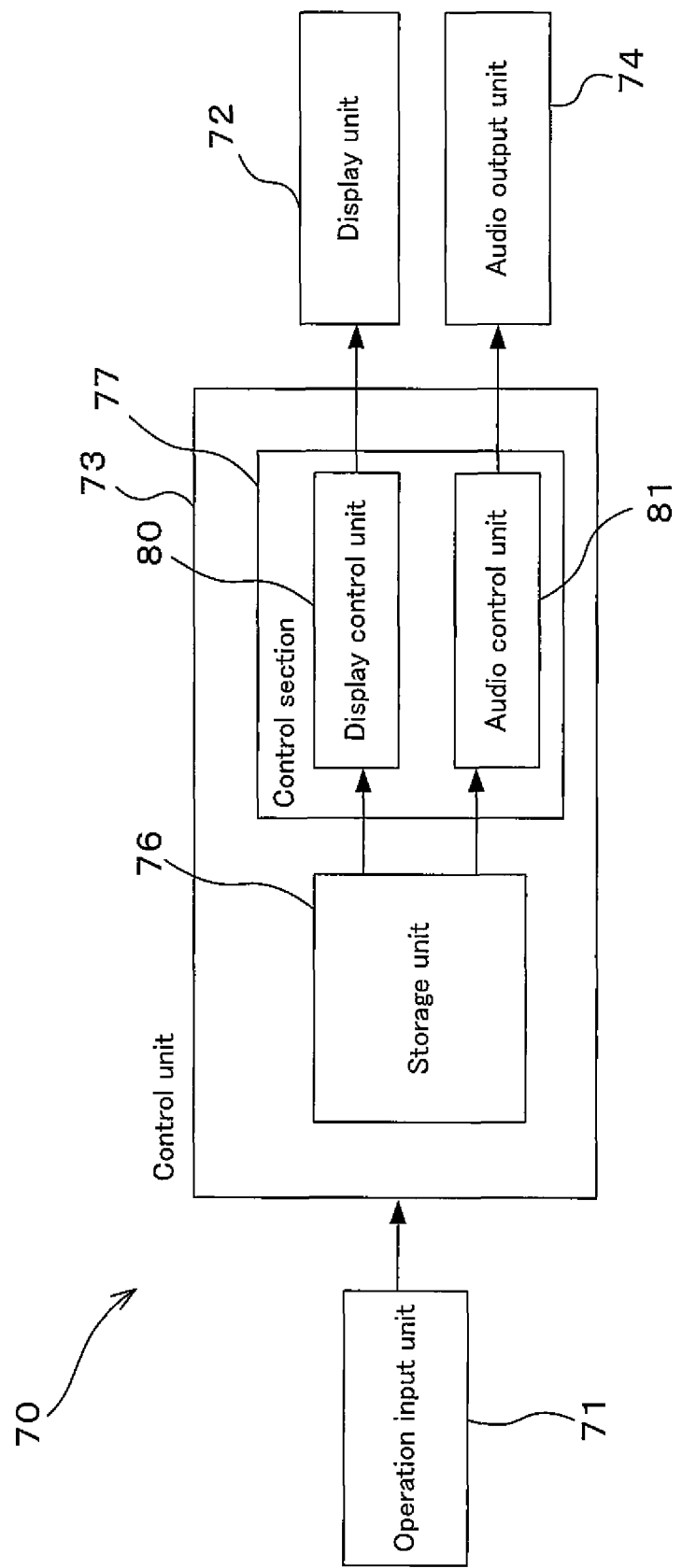
FIG. 7 is a diagram illustrating an example of a configuration of a data generation system according to the present invention.

Next, a method of generating the sequence data 28 according to the present invention will be described. The sequence data 28 is generated using a data generation system. An embodiment of the data generation system according to the present invention will be described below. FIG. 7 is a diagram illustrating an example of a configuration of the data generation system according to the present invention. As illustrated in FIG. 7, the data generation system 70 includes an operation input unit 71 that receives a user's operation, a display unit 72 that presents the user with an edit image, a control unit 73 serving as a computer, and an audio output unit 74 that outputs a sound. Examples of the operation input unit 71 include a keyboard, a mouse, and a touch panel. Examples of the display unit 72 include a monitor and a projector. Further, the audio output unit 74 includes a speaker or the like.

The control unit 73 is configured such that a microprocessor is combined with various kinds of peripheral devices such as an internal storage device (for example, a ROM or a RAM) necessary for an operation of the microprocessor. The control unit 73 includes a storage unit 76 that stores a computer program and various kinds of data which are used to actualize the present invention, and a control section 77 that controls an operation of the data generation system 70. As a computer program stored in the storage unit 76 is executed by the control section 77, a display control unit 80 and an audio control unit 81 are generated in the control section 77. The display control unit 80 and the audio control unit 81 are logical devices actualized by a combination of computer hardware and a computer program. Data stored in the storage unit 76 includes music data. The audio control unit 81 generates an audio reproduction signal corresponding to the music data, outputs the audio reproduction signal to the audio output unit 74, and thus causes the audio output unit 74 to reproduce a predetermined sound (including music or the like). Meanwhile, the display control unit 80 executes the computer program stored in the storage unit 76 with reference to various kinds of data (including music data) stored in the storage unit 76, and thus causes edit image to be displayed on the display unit 72. Further, the display control unit 80 updates the edit image displayed on the display unit 72 according to inputs of operations by the user through the operation input unit 71. Incidentally, an external storage device that is separately connected to the control unit 73 and is capable of transmission and reception of data may be used as a device that stores a computer program and various kinds of data which are used to actualize the present invention. As examples of the external storage device, there may be used a storage medium in which data remains stored even when power is not supplied such as an optical storage medium including a digital versatile disc-read only memory (DVD-ROM), a compact disc-read only memory (CD-ROM) or the like, and a non-volatile semiconductor memory device including an electrically erasable programmable read-only memory (EEPROM) or the like.

Figure 8:
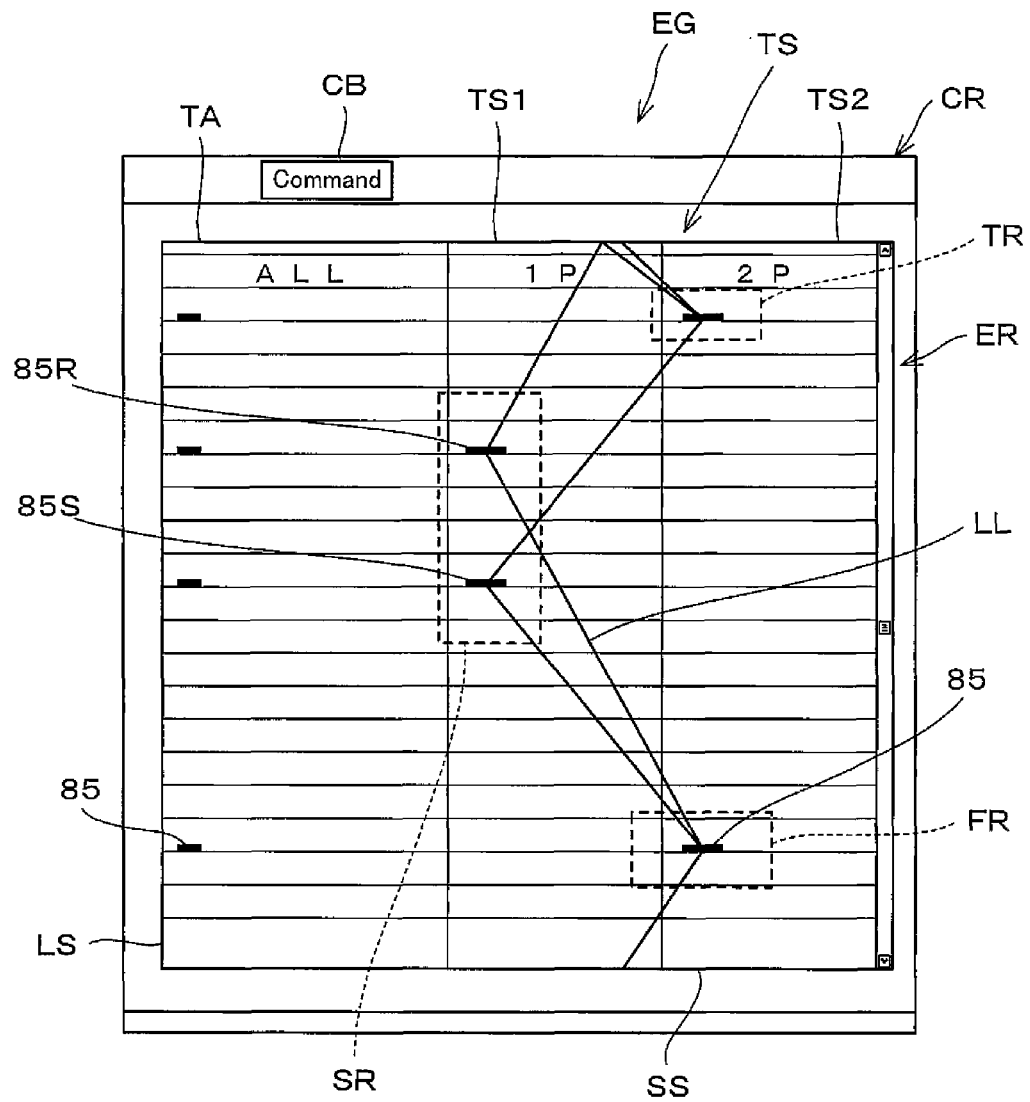
FIG. 8 is a diagram schematically illustrating an example of an editing screen.

Next, the details of an editing screen will be described with reference to FIG. 8. FIG. 8 is a diagram schematically illustrating an example of an editing screen when the data generation system according to the present invention is used for generation of the sequence data 28. As illustrated in FIG. 8, an editing screen EG has a rectangular shape. And the editing screen EG includes an editing region ER on which information of each operation timing is displayed, and a command region CR that is formed around the editing region ER and used to execute a module capable of editing information of the editing region ER. A command button CB used to select various kinds of modules is displayed on the command region CR. Meanwhile, a timing information display region TA used to display all operation timings of a game and a reference portion indication region TS used to distinctively display an operation timing of each of the operation reference portions 55A and 55B are displayed on the editing region ER. Further, the reference portion indication region TS includes a first operating unit region TS1 used to display an operation timing corresponding to the first operation reference portion 55A, and a second operating unit region TS2 used to display an operation timing corresponding to the second operation reference portion 55B. The regions TA, TS1, and TS2 are arranged in parallel in a direction of a horizontal axis SS so as to divide the horizontal axis SS while sharing a vertical axis LS. The vertical axis LS represents a lapse of time in an upward direction. Further, a cursor (not illustrated) used to select various kinds of modules, various kinds of information, or the like is displayed on the editing screen EG.

A block 85 is arranged on the timing information display region TA at a timing corresponding to each of all operation timings of the game. Further, the block 85 is arranged on the first operating unit region TS1 at a timing corresponding to an operation timing on the first operation reference portion 55A, and the block 85 is arranged on the second operating unit region TS2 at a timing corresponding to operation timing on the second operation reference portion 55B. The operating unit regions TS1 and TS2 are color-coded with the same color combination as the operation reference portions 55A and 55B, respectively. Specifically, the first operating unit region TS1 is displayed in red, the second operating unit region TS2 is displayed in blue, and the blocks 85 arranged on the operating unit regions TS1 and TS2 are displayed with colors corresponding to the regions, respectively.

Furthermore, a connecting line LL that connects the block 85 arranged on one region of the operating unit regions TS1 and TS2 with the block 85 arranged on the other region is displayed on the editing screen EG. The connecting line LL represents a correspondence relation between the block 85 arranged on the one region with the block 85 arranged on the other region. Specifically, for example, when one connecting line LL extends from one block 85 arranged on one region to a next block 85 arranged on the other region at the position corresponding to a next timing of the one block 85, one object 60 corresponding to an operation timing represented by the next block 85 appears at the arrival position of the object 60 corresponding to an operation timing represented by the one block 85 of an operation timing represented by the one block 85. Then, the appeared object 60 moves from the appearance position to the operation reference portion corresponding to the region in which the next block 85 is arranged in order to indicate an operation timing corresponding to the next block 85. Further, when two connecting lines extend from one block 85 of one region to two blocks of the other region arranged at a timing following the one block 85, two objects 60 respectively corresponding to operation timings represented by two blocks 85 appear at the arrival position of the object 60 corresponding to an operation timing represented by the one block 85 of an operation timing represented by the one block 85. The appeared two objects 60 move from the appearance position to the operation reference portion corresponding to the other region in order to indicate operation timing respectively corresponding to the two objects 60. In other words, the connecting line LL represents a correspondence relation in which an arrival position of an object 60 corresponding to a block 85 positioned at a starting point of the connecting line LL corresponds to an appearance position of an object 60 corresponding to a block 85 positioned at an ending point of the connecting line LL, and a timing at which the block 85 positioned at the starting point of the connecting line LL is arranged corresponds to a display start timing of the object 60 corresponding to the block 85 positioned at the ending point of the connecting line LL.

In the example of FIG. 8, the connecting line LL extends from the block 85 surrounded by a dashed line FR to the two blocks 85 surrounded by a dashed line SR. For this reason, the two objects 60 respectively corresponding to the two blocks 85 surrounded by the dashed line SR positioned at the ending point of the connecting line LL start to be displayed at an operation timing corresponding to the block 85 surrounded by the dashed line FR positioned at the starting point of the connecting line LL. Further, the two objects 60 respectively corresponding to the two blocks 85 surrounded by the dashed line SR start to be displayed at the position of the second operation reference portion 55B, corresponding to the second operating unit region TS2 in which the block 85 surrounded by the dashed line FR is arranged, at which the object 60 corresponding to the block 85 arrives. Then, the two objects 60 respectively corresponding to the two blocks 85 surrounded by the dashed line SR move to arrive at the first operation reference portion 55A corresponding to the first operating unit region TS1 in which the objects 60 are arranged at operation timings respectively corresponding to the objects 60. In the example of FIG. 8, this correspondence relation is represented by the two connecting lines LL that extend from the block 85 surrounded by the dashed line FR at the starting point to the two blocks 85 surrounded by the dashed line SR at the ending point. The connecting line LL serves as display start position information and display start timing information according to the present invention.

Figure 9:
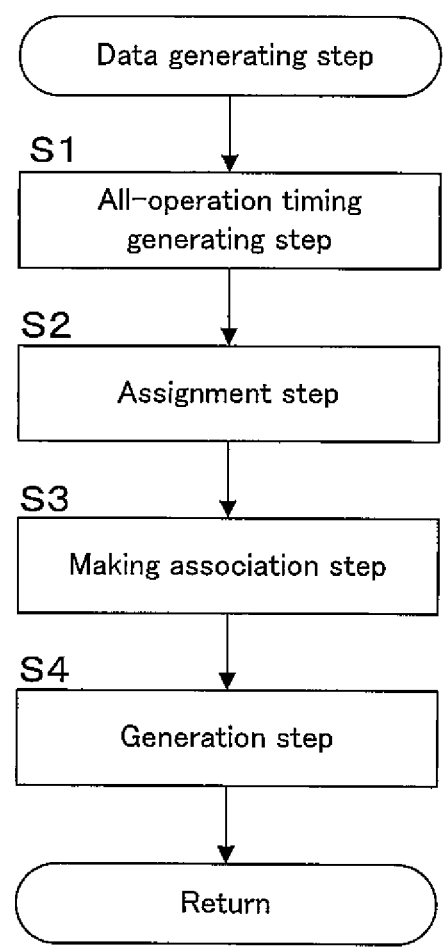
FIG. 9 is a diagram illustrating an example of a data generating step using a data generation system.

Next, a method of generating the sequence data 28 using the data generation system 70 will be described. FIG. 9 is a diagram illustrating an example of a data generating step using the data generation system 70. First, in all-operation timing generating step S1, the user executes an information generating module, and selects music to be reproduced from music data. The information generating module sets a start timing of the selected music as a mark timing. The user executes an operation on the operation input unit 71 in tune with a rhythm of the reproduced music. In response to the user's operation, the information generating module compares a timing at which the operation has been executed with a start timing of the music, and calculates an operation timing of the user as an elapsed timing in the music. Then, the information generating module sets the calculated elapsed timing in the music as an operation timing. The display control unit 80 refers to the set operation timing and then causes the block 85 to be displayed at a timing of the timing information display region TA corresponding to the operation timing. Incidentally, the information generating module can be actualized by using a well-known technique.

Figure 10:
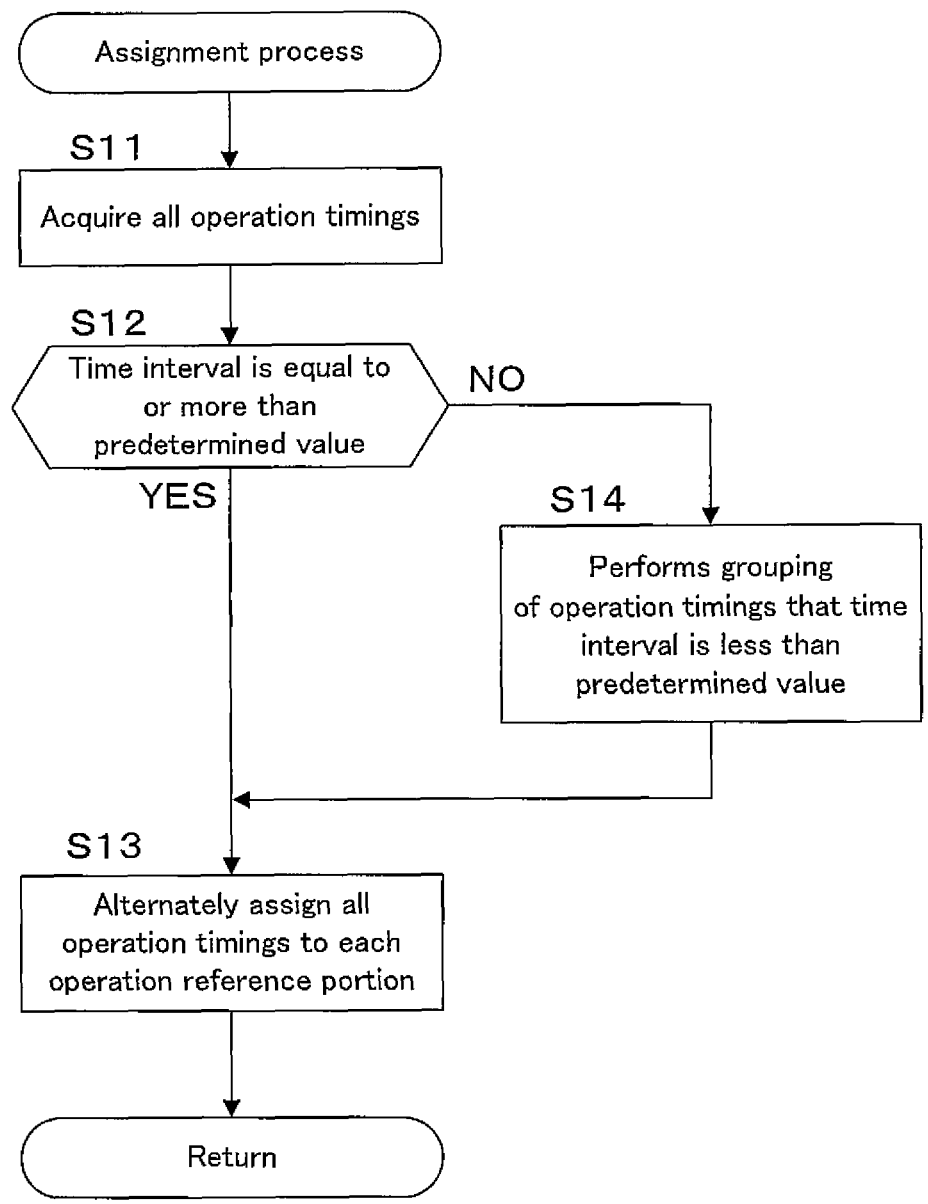
FIG. 10 is a diagram illustrating an example of a flowchart of an assignment process routine.

Next, in assignment step S2, the user causes the data generation system 70 to execute an assignment process routine. Specifically, when the user gives an instruction to start the assignment process routine, the display control unit 80 executes the assignment process routine. FIG. 10 is a diagram illustrating an example of a flowchart of the assignment process routine executed by the display control unit 80. In step S11, the display control unit 80 acquires information of all operation timings generated in all-operation timing generating Step S1. Next, in step S12, the display control unit 80 determines whether or not a time interval between operation timings is equal to or more than a predetermined value. For example, when the operation indication mark moves between the operation reference portions at a set time interval, a value of a time interval that causes the moving velocity of the operation indication mark to be inappropriate for an indication of an operation timing is set as the predetermined value. When a positive determination is made in step S12, the process proceeds to step S13.

In contrast, when a negative determination is made in step S12, that is, when among intervals between all operation timings, any one interval between a certain operation timing and a next operation timing is less than the predetermined value, the display control unit 80 proceeds to step S14. In step S14, the display control unit 80 specifies the certain operation timing and the next operation timing in which the time interval between the certain operation timing and the next operation timing is less than the predetermined value, performs grouping by adding common information to the specified operation timings, and then proceeds to step S13.

Next, in step S13, the display control unit 80 alternately assigns all operation timings to the operating unit regions TS1 and TS2 so that an operation timing can alternately come in the operation reference portions 55A and 55B based on information of all operation timings. Specifically, information in which information of the operation reference portion corresponding to each operating unit region is added to an operation timing arranged in each operating unit region is generated. At this time, an operation timing grouped in step S14 is assigned in a grouped state. For this reason, the certain operation timing and the next operation timing in which an time interval is less than the predetermined value are assigned to the same operating unit region. When the process of step S13 ends, the display control unit 80 ends the current routine. As a result of this routine, information in which information of the operation reference portion is added to each operation timing is generated, and thus the display control unit 80 causes the block 85 to be displayed on the operating unit region TS1 or TS2 at the assigned operation timing with reference to the generated information. In the example of FIG. 8, in the case in which the time interval is less than the predetermined value, the certain operation timing corresponds to a block 85S, and the next operation timing corresponds to a block 85R. As illustrated in FIG. 8, the blocks 85S and 85R are arranged in the same operating unit region.

Referring back to FIG. 9, in making association step S3, the user sets a correspondence relation between the blocks 85 arranged in the operating unit regions TS1 and TS2 using a drawing generating module that connects two points by a straight line. For example, the correspondence relation may be set as follows. First, the user selects and executes a drawing generating module through the command button CB in the editing region ER. Incidentally, a well-known technique may be used as the drawing generating module. For example, when a mouse is used as the operation input unit 71, this selection is made such that a cursor is placed on a selection target, and then a mouse is clicked. A well-known technique to discern various kinds of clicked modules and various kinds of information is employed in the editing screen EG. Next, in a state in which the drawing generating module has been executed, two blocks 85 in which a correspondence relation therebetween needs to be set are sequentially selected. As a result, a connecting line LL extending from a first selected block 85 to a next selected block 85 is drawn. Specifically, information of an operation timing positioned at the starting point of the connecting line LL is added to an operation timing corresponding to the block 85 positioned at the ending point of the connecting line LL. Then, the display control unit 80 displays the connecting line LL connecting the blocks 85 with reference to the information of the operation timing added to each operation timing.

The user selects a block 85 arranged on one operating unit region and a block 85 arranged on the other operating unit region as two blocks 85 connected by the connecting line LL. Further, in this case, among blocks 85 arranged on the other operating unit region, a block 85 arranged at a nearest operation timing from a block 85 arranged on the one operating unit region to the future is selected. However, as in the case in which an operation timing having the short time interval described above is present, there are cases in which a plurality of blocks 85 are consecutively arranged in the same region, for example, in the other operating unit region. In this case, a plurality of connecting lines LL are drawn so as to extend from a block 85 on one operating unit region positioned directly before a block 85 arranged at an earliest timing among a plurality of consecutive blocks 85 in the other operating unit region to a plurality of consecutive blocks 85 on the other operating unit region. Specifically, after selecting the block 85, arranged on one operating unit region, to serve as the starting point of the connecting lines LL, the user performs twice or more operations of selecting each of a plurality of blocks 85, arranged on the other operating unit region, to serve as the ending points.

Further, the block 85 of one operating unit region nearest, in the future, to a plurality of blocks 85 consecutively arranged on the same other operating unit region serves as one common block 85. Further, when blocks 85 to serve as the ending points of the plurality of connecting lines LL respectively extending from the plurality of blocks 85 are present, the user preferentially selects a block having an earliest operating timing from among blocks 85 to serve as the starting points of the plurality of connecting lines LL as a block 85 connected with the blocks 85 to serve as the ending points of the plurality of connecting lines LL. Then, the user draws the connecting lines LL such that regarding the remaining blocks 85 of the plurality of blocks 85 to serve as the starting points of the connecting line LL on the common block 85, the remaining blocks 85 are connected with the blocks 85 arranged on one operating unit region in descending order of operation timing, respectively. As a result, the connecting lines LL are drawn such that one block does not correspond to the ending points of a plurality of blocks 85.

In the example of FIG. 8, two consecutive blocks surrounded by the dashed line SR are presented on the first operating unit region TS1 serving as the other operating unit region. Thus, the two connecting lines LL are displayed so as to extend from the block 85 surrounded by the dashed line FR arranged on the second operating unit region TS2 serving as one operating unit region at an operation timing immediately before the two blocks 85 surrounded by the dashed line SR to the two blocks 85 surrounded by the dashed line SR. In this case, in order to draw the two connecting lines LL, it is preferable that the block 85 surrounded by the dashed line FR be first selected, and then an operation of alternately selecting any one of the two blocks 85 is executed twice. As a result, the two connecting lines LL that extend from the block 85 surrounded by the dashed line FR in the second operating unit region TS2 to the two blocks 85 surrounded by the dashed line SR in the first operating unit region TS1, respectively, are drawn. Further, in the example of FIG. 8, a common block 85 surrounded by a dashed line TR is present as the block 85 nearest, in the future, to the two blocks 85 surrounded by the dashed line SR among the objects 60 arranged in the second operating unit region TS2. And, the block 85 surrounded by the dashed line TR is connected with the block 85 which is earlier in operation timing between the two blocks 85 surrounded by the dashed line SR. Further, the remaining blocks 85 of the two blocks 85 surrounded by the dashed line SR is connected with the block 85, in which an operation timing comes in the same second operating unit region TS2, following the block 85 surrounded by the dashed line TR.

Figure 11:
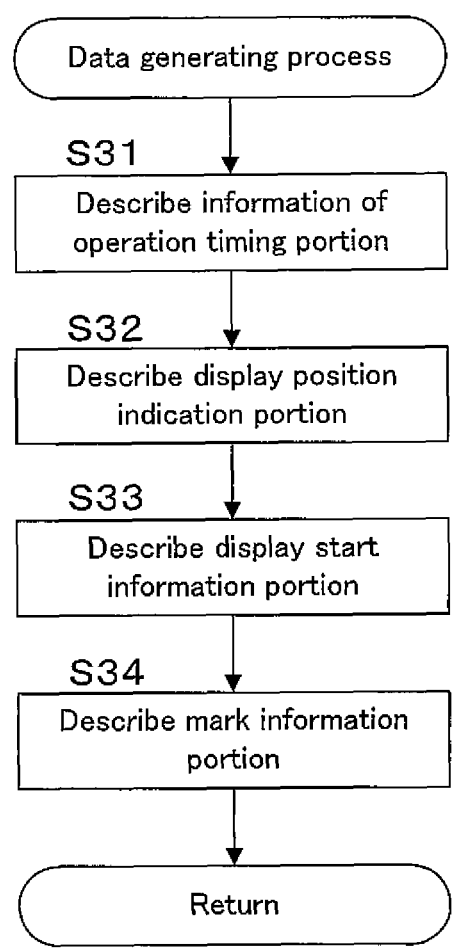
FIG. 11 is a diagram illustrating an example of a flowchart of a data generating process routine.

Referring back to FIG. 9, in generation step S4, a data generating step is executed. An example of the data generating step executed by the control unit 73 will be described with reference to FIG. 11. FIG. 11 is a diagram illustrating an example of a flowchart of the data generating process routine executed by the control unit 73. When the routine of FIG. 11 starts, in step S31, the control unit 73 first describes information of the operation timing portion 28c of the sequence data 28. Specifically, a timing corresponding to a timing at which the block 85 is arranged is described as an operation timing based on the block 85 arranged on the timing information display region TA of the editing screen EG. Next, in step S32, the control unit 73 describes information of the operation reference portion to be associated with information of the described operation timing in the display position indication portion 28e. The display position indication portion 28e is described based on the block 85 arranged on each of the operating unit regions TS1 and TS2. Specifically, the second operation reference portion 55B serving as the starting point at the time of movement to the first operation reference portion 55A corresponding to the first operating unit region TS1 is described as information of the operation reference portion associated with an operation timing represented by the block 85 arranged on the first operating unit region TS1. Further, on the other hand, the first operation reference portion 55A serving as the starting point at the time of movement to the second operation reference portion 55B corresponding to the second operating unit region TS2 is described as information of the operation reference portion associated with an operation timing represented by the block 85 arranged on the second operating unit region TS2.

Next, in step S33, the control unit 73 describes information of the display start timing of the object 60 corresponding to the described operation timing in the display start information portion 28d based on the operation timing represented by the block 85 arranged at the starting point of the connecting line LL. Specifically, a timing represented by the block 85 positioned on the starting point of the connecting line LL is described as the display start timing to be set to the object 60 corresponding to the operation timing represented by the block 85 positioned at the ending point of the connecting line LL. Next, in step S34, the control unit 73 describes the mark information portion 28f as information indicating the object 60 to be displayed in association with the described operation timing based on the connecting line LL. The mark information portion 28f is described by various kinds of letters corresponding to the number of connecting lines LL. Specifically, the mark information portion 28f is described such that as information indicating the object 60, "A" is described when the number of connecting lines LL extending from the block 85 positioned at the starting point of the connecting line LL in which the block 85 corresponding to the described operation timing serves as the ending point is one (1), "B" is described when the number of connecting lines LL is two (2), and "C" is described when the number of connecting lines LL is three (3). And, same "A" is described for an operation timing corresponding to the block 85 positioned at the ending point of the connecting line LL extending from the block 85 corresponding to the operation timing described as "A." This is similarly applied even when an operation timing is described as "B", "C", or the like. Further, when a plurality of connecting lines LL extends from one block 85, the description is made such that an operation timing corresponding to the block 85 which is earliest in an operation timing among the blocks 85 positioned at the ending points of the plurality of connecting lines LL is described as "A," a second earliest operation timing is described as "B," and a third earliest operation timing is described as "C." When the process of step S34 ends, the control unit 73 ends the current routine. As described above, the sequence data 28 is generated by executing the routine of FIG. 11.

According to the data generation system of this embodiment, it is possible to check an operation timing assigned to each operating unit region while checking all operation timings, and thus it is possible to easily understand a difficulty level of the game. Furthermore, since the correspondence relation between the operation timings is represented by the connecting line LL, it is possible to easily imagine display timings of a plurality of objects 60 and the flow of each object 60 that rebounds from each of the operation reference portions 55A and 55B. Thus, the generation efficiency of sequence data can be improved.

In the above-described embodiment of the data generation system, the control unit 73 functions as an editing area presenting device by causing the display unit 72 to display the editing screen EG through the display control unit 80, and functions as an information presenting device by causing the connecting line LL to be displayed on the editing screen RG. Further, the control unit 73 functions as an editing device by executing various kinds of modules through the display control unit 80. Specifically, the control unit 73 functions as a reference timing setting device by executing the information generating module or the like through the display control unit 80, functions as an information determining device by executing determination of information, functions as an operating unit information adding device, an assignment device, and a grouping device by executing the assignment routine of FIG. 10, and functions as an timing information adding device by executing a drawing module. Furthermore, the control unit 73 functions as a data generating device by executing the routine of FIG. 11.

Incidentally, in the above-described embodiment, in assignment step S2 of the data generating step of FIG. 9, the control unit 73 executes the assignment process routine illustrated in FIG. 10 but is not limited to an embodiment of executing this process. For example, the user may execute the assignment process by a manual process of selecting the block 85 on the timing information display region TA and copying the selected block 85 to the operating unit region TS1 or TS2. By the addition of information of an operating unit corresponding to a duplication position to the copied operation timing, an assignment to each operating unit region can be made. The selecting and copying of the block 85 can be actualized using a well-known technique. Further, in the above-described embodiment, when a time interval between a certain operation timing and a next operation timing is less than a predetermined value, the certain operation timing and the next operation timing are assigned to the same operating unit region. However, the present invention is not limited to this embodiment. Each operation timing of the timing information display region TA may be flexibly assigned to each of the operating unit regions TS1 and TS2. Further, in the above-described embodiment, the control unit 73 functions as the grouping device by executing the routine of FIG. 10, and performs grouping on a certain operation timing and a next operation timing in which a time interval is less than a predetermined value. However, the present invention is not limited to this embodiment. For example, grouping may be actualized such that the user selects the certain operation timing and the next operation timing.

Further, making the association between operation timings is not limited to the above-describe method, and making the association can be flexibly performed. Further, the connecting line LL may not be necessarily disposed between each pair of all operation timings. In other words, there may be no operation timing serving as the starting point of the connecting line LL. Further, the connecting line LL may be displayed in a discriminable form according to a region in which the block 85 serving as the starting point is arranged. For example, the connecting line LL may be displayed with a color corresponding to a region in which the block 85 serving as the starting point is arranged.

Next, processing of the game control unit 11 when the music game is executed by the game machine 1 will be described. The game control unit 11 reads the game program 21, performs an initial setting necessary to execute the music game, and then enters a standby state to receive a game start instruction from a player. For example, the game start instruction includes an operation specifying data used in the game such as selection of music to be played in the game or a difficulty level. A procedure receiving the instructions may be the same as in a known game.

When a game start is instructed, the game control unit 11 cause a reproduction of the music to start through the speaker 14 by reading the music data 25 corresponding to the music selected by the player and outputting the read music data 25 to the audio output control unit 13. Through this operation, the control unit 10 functions as a music reproducing device. Further, the game control unit 11 causes the game region 52 and the information region 53 to be displayed on the monitor 3 by reading the sequence data 28 corresponding to the player's selection in synchronization with reproduction of a music, generating image data necessary to draw the game region 52 and the information region 53 with reference to the image data 27, and outputting the generated image data to the display control unit 12. Furthermore, as processes necessary to display the game region 52 or the like during execution of the music game, the game control unit 11 repeatedly executes a sequence process routine illustrated in FIG. 12, a path decision process routine illustrated in FIG. 13, and an operation evaluation routine illustrated in FIG. 14 at a predetermined period. Incidentally, the sequence processing unit 15 undertakes the routines of FIGS. 12 and 13, and the operation evaluating unit 16 undertakes the operation evaluation routine of FIG. 14.

Figure 12:
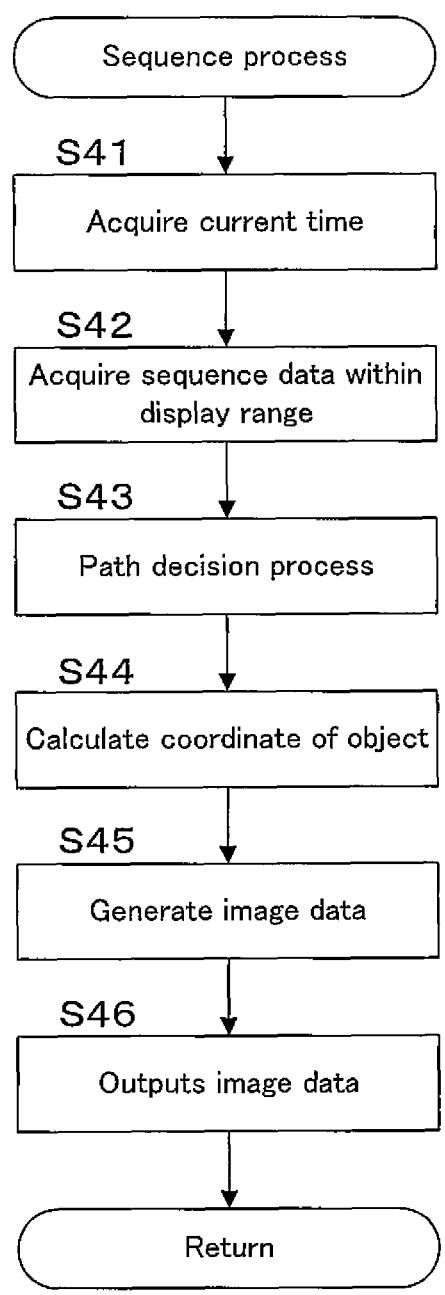
FIG. 12 is a diagram illustrating an example of a flowchart of a sequence process routine.

FIG. 12 illustrates an example of a flowchart of the sequence process routine executed by the sequence processing unit 15. When the routine of FIG. 12 starts, in step S41, the sequence processing unit 15 of the game control unit 11 first acquires a current time in music. For example, clocking starts, by an internal clock of the game control unit 11, from a reproduction start point in time of the music, and the current time is acquired based on a value of the internal clock. Next, in step S42, the sequence processing unit 15 acquires data of the object 60 in which a display start timing and an operation timing are present within a time length corresponding to a display range of the game region 52 from the sequence data 28. For example, the display range is set to a time range of about two bars of music from the current time to the future.

Figure 13:
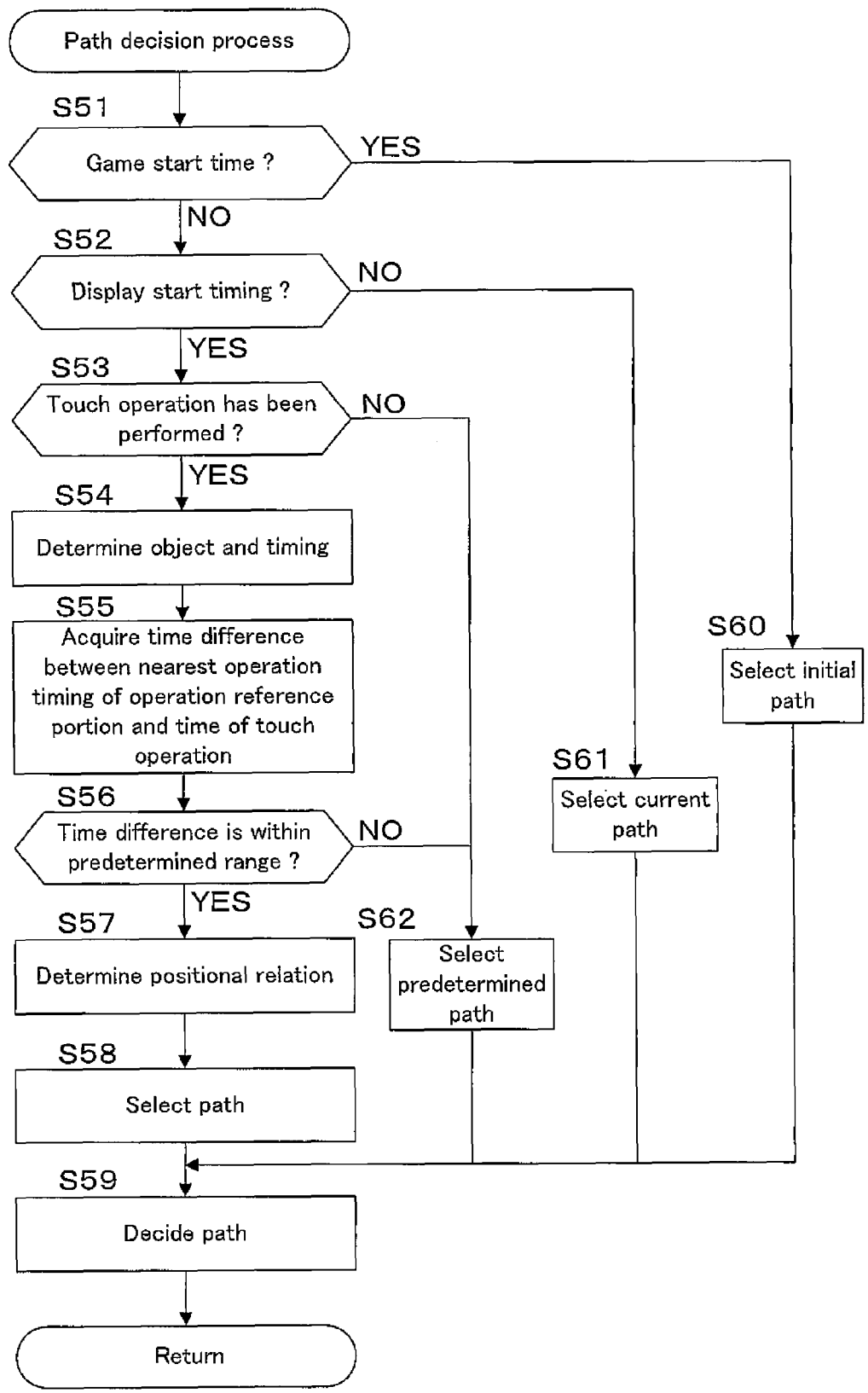
FIG. 13 is a diagram illustrating an example of a flowchart of a path decision process routine.

Next, in step S43, paths W of all objects 60 to be displayed are decided. For example, this decision is actualized by the execution of the routine of FIG. 13. FIG. 13 illustrates an example of a flowchart of the path decision process routine executed by the sequence processing unit 15. When the routine of FIG. 13 starts, in step S51, the sequence processing unit 15 first determines whether or not this is a start time of the game. When a positive determination is made in step S51, the process proceeds to step S60, but when a negative determination is made, the process proceeds to step S52. In step S60, a previously set path is selected as a path to display the object 60, and then the process proceeds to step S59. For example, the path W3 extending from the rebounding point R1 which is included in the first operation reference portion 55A and is at an n-th position from the left side is set as the previously set path.

Meanwhile, in step S52, it is determined whether or not a display of the object 60 is a display at a display start timing. When a negative determination is made in step S52, that is, when it is determined that a display of the object 60 is not a display at a display start timing and a path to be displayed has been already selected, the process proceeds to step S61. In step S61, the already selected path, that is, a current path is selected as the path to be displayed, and the process proceeds to step S59.

In contrast, when a positive determination is made in step S52, that is, when it is determined that a display of the object 60 is a display at a display start timing and a path to be displayed has not been selected, the process proceeds to step S53. In step S53, it is determined whether or not the touch operation has been performed on the object 60 with reference to an output signal of the touch panel 5. When a negative determination is made in step S53, the process proceeds to step S62, but when a positive determination is made, the process proceeds to step S54. In step S62, a predetermined path is selected as the path to display the object 60, and the process proceeds to step S59. For example, the selection of the predetermined path in step S62 is implemented such that a path adjacent to a path on which the object 60 corresponding to the object 60 that starts to be displayed, that is, the object 60 that has immediately previously arrived at the rebounding point R1 or R2 used as the appearance position of the object 60 that starts to be displayed has been displayed, or a path which is at the shortest distance from the appearance position toward the operation reference portion 55A or 55B to arrive is set as the predetermined path.

Meanwhile, in step S54, an operation reference portion on which the touch operation has been performed and a timing (a time in the music) at which the touch operation has been performed are determined based on a signal output from the touch panel 5. Next, in step S55, a nearest operation timing described in the sequence data 28 with respect to the operation reference portion on which the touch operation has been performed, that is, an operation timing which is closest in time and associated in the sequence data 28 with respect to the operation reference portion on which the touch operation has been performed is specified, and a time difference between the operation timing and a time at which the touch operation has been performed is acquired.

Next, in step S56, the sequence processing unit 15 determines whether or not each player's operation is appropriate by determining whether or not the time difference is within a predetermined range. A predetermined time range around an operation timing of a comparison target is set as the predetermined range. When a negative determination is made in step S56, the process proceeds to step S62. In step S62, the predetermined path is selected as the path to display the object 60 as described above, and then the process proceeds to step S59. In contrast, when a positive determination is made in step S56, the process proceeds to step S57.

Next, in step S57, the sequence processing unit 15 determines the positional relation between the operation position at which the touch operation has been performed on the operation reference portion 55A or 55B and the position of the object 60 based on a signal output from the touch panel 5. Specifically, any one of the contact region S, the right region R, the left region L, and the remaining region of the object 60 that starts to be displayed or the object 60 that has most recently arrived at the appearance position is determined as the touch position of the object 60. Next, in step S58, the sequence processing unit 15 selects a path to arrange the object 60 according to the positional relation determined in step S57. For example, the selection of the path is performed as follows. First, any one of the right region R, the left region L, the contact region S, and the remaining region is assigned to each path W. Next, a path assigned to the touch position is selected from among a plurality of paths W extending from the appearance position based on the determination result in step S57. In the example of FIG. 3, in the rebounding point R1, the straight line path W2 is assigned to the contact region S and the remaining region, the first right path W3 is assigned to the left region L, and the first left path W1 is assigned to the right region R. Thus, the straight line path W2 is selected when the contact region S or the remaining region of the object 60 is touched, the first left path W1 is selected when the right region R is touched, and the first right path W3 is selected when the left region L is touched.

Next, in step S59, the sequence processing unit 15 decides the path selected in the process of each of step S58 and steps S60 to S62 as the path to display the object 60, and then ends the current routine.

Returning to the routine of FIG. 12, in step S44, the sequence processing unit 15 calculates coordinates of all objects 60 to be displayed on each path W in the game region 52. For example, this calculation is performed as follows. First, the path W to display each object 60 included in the display range is determined based on the processing result of step S43. Next, the position of each object 60 from the operation reference portion 55A or 55B in the time axis direction (that is, the moving direction of the object 60) is determined according to the moving direction (the operation reference portion 55A or 55B at the arrival position) corresponding to each object 60 and a time difference between each operation timing and a current time. Through this operation, it is possible to acquire the path W to arrange each object 60 and coordinates of each object 60 necessary to arrange each object 60 on the corresponding path W along the time axis from the operation reference portion 55A or 55B.

Next, in step S45, the sequence processing unit 15 generates image data necessary to draw the game region 52 based on the coordinates of the object 60 calculated in step S44. Specifically, image data that causes each object 60 to be arranged on the calculated coordinates is generated. An image of the object 60 or the like may be acquired from the image data 27. Next, in step S46, the sequence processing unit 15 outputs the image data to the display control unit 12. As a result, the game region 52 is displayed on the monitor 3. When the process of step S46 ends, the sequence processing unit 15 ends the current sequence process routine. By executing repeatedly the above-described process, the object 60 is displayed on the designated operation reference portion 55A or 55B at a display start timing described in the sequence data 28, and the object 60 moves between the two operation reference portions 55A and 55B so as to arrive at the designated operation reference portion 55A or 55B at an operation timing described in the sequence data 28.

Figure 14:
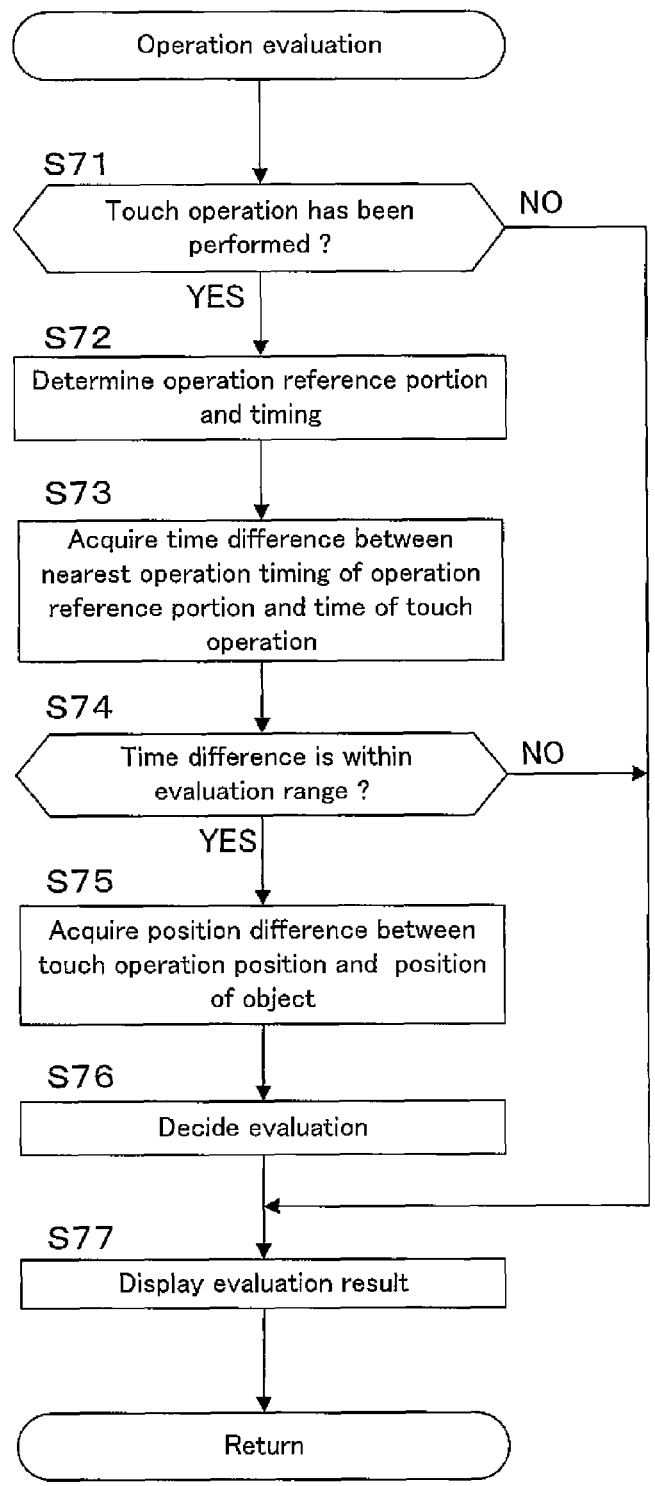
FIG. 14 is a diagram illustrating an example of a flowchart of an operation evaluation routine.

Next, the operation evaluation routine of FIG. 14 will be described. When the operation evaluation routine of FIG. 14 starts, in step S71, the operation evaluating unit 16 first determines the presence or absence of the touch operation on the object 60 with reference to an output signal of the touch panel 5. At this time, when the position other than the operation reference portions 55A and 55B is touched, it is determined no touch operation has been performed. When it is determined no touch operation has been performed, the operation evaluating unit 16 ends the current routine, and when it is determined the touch operation has been made, the process proceeds to step S72. In step S72, the operation evaluating unit 16 determines a timing (a time in the music) at which the touch operation has been made based on a position signal output from the touch panel 5. Next, in step S73, the operation evaluating unit 16 specifies a nearest operation timing described in the sequence data 28 with respect to the operation reference portion on which the touch operation has been performed, that is, an operation timing which is closest in time in the sequence data 28 with respect to the operation reference portion on which the touch operation has been performed, and acquires a time difference between the operation timing and a time at which the touch operation has been performed.

Next, in step S74, the operation evaluating unit 16 determines whether or not the player's operation is appropriate by determining whether or not the time difference is within the evaluation range. A predetermined time range around an operation timing of a comparison target is set as the evaluation range. For example, a plurality of steps of levels are set centering on an operation timing, and a time range in which the levels are set is dealt as the evaluation range. When it is determined in step S74 that the time difference is outside the evaluation range, the operation evaluating unit 16 ends the current routine. In contrast, when it is determined that the time difference is within the evaluation range, the process proceeds to step S75. In step S6 S75, the operation evaluating unit 16 specifies an operation position at which the touch operation has been performed on the operation reference portion 55A or 55B and an operation timing which is closest in time in the sequence data 28 with respect to the operation reference portion at which the touch operation has been performed, and acquires a position difference between the operation position and the arrival position of the object 60 indicating the operation timing.

Next, in step S75, the operation evaluating unit 16 decides an evaluation on the player's touch operation based on the time difference acquired in step S74 and the position difference acquired in step S75. For example, this evaluation is implemented as follows. First, the evaluation related to the time difference is actualized by determining whether or not a timing of the touch operation belongs to any one of a plurality of levels set in the time range. The plurality of levels are set such that the time range is divided in units of predetermined time periods, and the touch operation that belongs to a division close to an operation timing of each division is evaluated high. Further, the evaluation related to the position difference is actualized by comparing the center position of the object 60 and the touch operation position. For example, in the evaluation of the position difference, a region up to twice the diameter of the object 60 is evaluated as "GOOD", and the remaining region is evaluated as "MISS." Alternatively, the inner side further than the outer circumference of the object 60 is evaluated highest, a predetermined evaluation range is set such that an evaluation is steadily lowered in units of certain distances from the outer circumference, and the evaluation is determined according to the evaluation range to which the position of the touch operation belongs to. Thereafter, the operation evaluating unit 16 proceeds to step S77, and controls an output to the display control unit 12 such that the evaluation result is displayed on at least one of the game region 52 and the information region 53. When the process of step S77 is completed, the operation evaluating unit 16 ends the current routine. Incidentally, in the example of FIG. 14, step of acquiring the difference between the position of the object and the position of the touch operation may be executed before step of acquiring the difference between the operation timing nearest to the operation reference portion and the time at which the touch operation has been performed. Further, in the example of FIG. 14, the evaluation of the position difference is performed such that "GOOD" or "MISS" is evaluated according to a region. However, when the position difference is outside a predetermined range, similarly to step S74, the subsequent process may be skipped, and then the current routine may end. In this case, for example, when an operation on the first operation reference portion 55A is required, an operation on an inappropriate position outside a predetermined range such as an operation executed on the second operation reference portion 55B can be excluded from an evaluation target.

As described above, according to the game machine 1 of this embodiment, the moving path and the moving velocity of the object 60 moving toward the next operation reference portion can be selected through the touch operation. Thus, one player can variously change a difficulty level of the game played by the other player through his/her operation, and thus amusement of the game can be improved.

Furthermore, according to the game machine 1 of this embodiment, when a time interval between a certain operation timing and a next operation timing is short, the sequence data 28 is generated such that the certain operation timing and the next operation timing are indicated by different objects 60. Further, in the sequence data 28, a common operation timing that comes prior to the certain operation timing is set as a display start timing of the object 60 corresponding to the certain operation timing and the object 60 corresponding to the next operation timing, which are used as the different objects. For this reason, at an operation timing that comes prior to the certain operation timing, an effect by which the object 60 is divided and increases in number can be rendered, and a moving time of the object 60 corresponding to the next operation timing can be sufficiently secured. Through this operation, even when a time interval between operation timings is short, the moving velocity of the operation indication mark can be prevented from becoming too fast.

In the above-described embodiment, the external storage device 20 of the game machine 1 functions as a music data storage device and a sequence data storage device. Further, the control unit 10 functions as a game region presenting device and a mark display control device by executing the routines of FIG. 12, and FIG. 13 through the sequence processing unit 15. Furthermore, the control unit 10 functions as an evaluating device by executing the routine of FIG. 14 through the operation evaluating unit 16.

The above-described embodiment has been described in connection with the example in which three paths W extend from one rebounding point R1 or R2. However, the number of paths extending each rebounding point is not limited. Thus, it is possible to set a number of paths omnidirectionally extending from each rebounding point. Further, it is possible to set a number of rebounding points R1 or R2 included in the operation reference portion 55A or 55B. In other words, a plurality of paths may be set such that the operation indication mark is omnidirectionally movable between the operation reference portions at all positions. Furthermore, a number of rebound points with both side walls 52R and 52L of the game region 52 and a number of paths starting from the rebound point may be set. Thus, a number of paths up to the rebound point and a number of paths after rebounding can be set. Further, the above-described embodiment has been described in connection with the example in which the object 60 is divided into four regions, the moving path is decided by comparing the position of the touch operation with the four regions of the object 60. However, the present invention is not limited to this embodiment. The operation indication mark may be divided into a number of regions according to a number of paths set to a game region. Thus, it is possible to cause the operation indication mark to move along a free path between the operation reference portions through the touch operation. Further, the present invention is not limited to the embodiment in which the operation indication mark is divided into a plurality of regions. For example, the moving path of the operation indication mark may be decided by comparing a fixed position such as the center position of the operation indication mark with the position of the touch operation.

The above-described embodiment has been described in connection with the example in which the path along which the operation indication mark moves is disposed between the operation reference portions. However, the present invention is not limited to this embodiment. For example, each path may extend up to both ends of the game region beyond each operation reference portion. In this case, for example, each operation indication mark moves so as to arrive at each operation reference portion at an operation timing described in the sequence data, and in the case in which an appropriate operation is not made on the operating unit when each operation indication mark arrives at the operation reference portion, the operation indication mark can be caused to move beyond the operation reference portion and collide with an end portion of the game region. In this case, preferably, a rebounding point is provided also on the end portion of the game region, and the position of the end portion of the game region at which the operation indication mark arrives serves as an appearance position of movement of a next operation indication mark. Further, in the above-described embodiment, the object 60 disappears at the arrival position when arrived, the arrival position serves as the appearance position of the object 60 corresponding to the operation timing indicated by the common object 60, and thus the object 60 moves as if the object 60 rebounds between the operation reference portions 55A and 55B. However, the movement of the object 60 is not limited to this embodiment. For example, the operation indication mark may not disappear each time when arrived at the rebounding point at the arrival position, and the operation indication mark may actually rebound from the rebounding point using the common object 60 as it is. In this case, for example, after rebounding from the rebounding point, a color of the operation indication mark may be changed to a color corresponding to the operation reference portion to arrive next. Thus, information about the operation reference portion toward which the operation indication mark moves can be given.

In the above-described embodiment, the moving path along which the object 60 moves toward the next operation reference portion is decided according to the positional relation between the position of the touch operation and the position of the object 60. However, the decision of the moving path is not limited to the example according to the positional relation. For example, the moving path may be decided according to an operation designating a direction such as an operation in which the position of the touch operation continuously changes.

Further, in the above-described embodiment, the moving path of the object 60 changes according to the touch operation, but the present invention is not limited to the configuration in which the moving path changes according to the player's operation. For example, the moving path may change according to the development or rendition of the game. In other words, the moving path of the object may change by a predetermined condition such as an operation on the operating unit or the development or rendition of the game. For the rendition of the game, as an example in which the moving path of the object 60 changes, the moving path of the object 60 may be decided according to a time interval between a certain operation timing and a next operation timing. Further, for example, as an example of the predetermined condition, the moving range of the operation indication mark may be restricted by an option prepared during the progress of the game, and the moving path may change by this restriction. Alternatively, the moving velocity of the operation indication mark may increase by another option prepared during the progress of the game, and the moving path may change by an increase in the moving velocity. Furthermore, the moving path may change such that the moving velocity changes according to the player's level.

In the above-described embodiment, a rectangular region is used as the game region 52, but the game region 52 is not limited to this embodiment. Regions of various shapes such as a polygonal shape and a circular shape may be used as the game region. Further, in the above-described embodiment, the two operation reference portions 55A and 55B respectively corresponding to both ends of the game region 52 in the longitudinal direction are provided, but the number of the operation reference portions is not limited to two (2). For example, a region in which three or more operation reference portions are provided apart from each other so that three or more players can play the game may be used as the game region.

In the above-described embodiment, there is executed the game which is played by a plurality of players so that players or a game machine itself functions as another player, but the present invention is not limited to this embodiment. For example, as another example, a game executed by the game machine 1 may be actualized such that only the first operation reference portion 55A is set so as to correspond to the operating unit, and the second operation reference portion 55B is arranged so as to simply function as a wall to rebound the operation indication mark. And, the game may be executed such that only the first operation reference portion 55A is provided on the game screen, the operation indication mark rebounds from a wall serving as a reference portion provided in the boundary of the game region, and the operation indication mark moves so as to arrive at only the first operation reference portion 55A or walls (or the other walls) arranged at the positions facing the first operation reference portion 55A and the first operation reference portion 55A at a timing described in the sequence data. In this case, a game that can variously change a difficulty level of the game and be played by one player can be actualized. Further, in this case, for example, the walls arranged at the positions facing the first operation reference portion 55A and the first operation reference portion 55A function as a plurality of reference portions according to the present invention. Further, a reference timing may be used as a timing described in the sequence data instead of an operation timing, and among reference timings, an arrival timing at the first operation reference portion 55A may serve as an operation timing. Further, in this case, the data generation system 70 may use the reference portion as the operation reference portion and use the reference timing as the operation timing. Thus, the generation efficiency of sequence data used for a one-player game can be improved.

Further, in the above-described embodiment, an operation timing is described as a timing described in the sequence data, but a display duration time may be described instead of an operation timing. In this case, an operation timing can be indicated by moving the object 60 so as to arrive at any one of operation reference portions at a timing in which a display duration time elapses from a display start timing.

In the above-described embodiment, the control unit 10 serving as the evaluating device performs an evaluation by comparing an operation timing of a touch operation with an operation timing described in the sequence data, but a function of the evaluating device may not be provided. In this case, a game machine of a match-up type in which an operation is made in tune with a rhythm of music while inducing an opponent player to make a mistake can be implemented.

In the above-described embodiments, the touch panel is used as the input device, but the input device is not limited to this embodiment. For example, as far as at least one operating unit is included, there may be used input devices having various configurations such as a controller in which a plurality of push buttons serving as an operating unit is provided.

In the above-described embodiments, the game machine 1 is configured as a music game machine in which music is reproduced, and an operation indication mark moves toward an operation reference portion based on a played time of the music. However, the present invention is not limited to this embodiment. The game machine 1 can execute various kinds of games as far as an operation timing is indicated through a video. Furthermore, the game system of the invention may be actualized in appropriate embodiments such as a game machine for business use installed in commercial facility, a stationary game machine for home use, a portable game machine, or a game system actualized using a network.

What is claimed is:

1. A data generation system generating sequence data, in which a reference timing in a game is described, which is used by being referred to by a computer as information indicating the reference timing of a game in which an operation indication mark displayed for indicating an operation on at least one operating unit to be operated by a player moves so as to arrive at least one of a plurality of reference portions at the reference timing in a game region in which the plurality of reference portions are arranged apart from each other, wherein the data generation system comprises:

a display unit that displays an editing screen;

an operation input unit that receives a user's operation;

an editing device that edits information to be displayed on the editing screen based on information of an operation on the operation input unit; and, a control unit coupled to the display unit, including a storage device, an editing area presenting device and an information presenting device, the storage device that stores the information indicating the reference timing of the game, the editing area presenting device causes a timing information display region displaying information of all reference timings in time series and a reference portion indication region displaying reference timings assigned to at least one of the plurality of reference portions among the all reference timings in time series for each reference portion to be displayed on the editing screen, and the information presenting device causes display start position information in which information of an operation indication mark corresponding to each reference timing assigned for each reference portion is associated with information of each reference portion in which each operation indication mark starts to be displayed on the reference portion indication region.

2. The data generation system according to claim 1, wherein the information presenting device further causes display start timing information in which information of the operation indication mark corresponding to each reference timing assigned for each reference portion is associated with information of a display start timing at which each operation indication mark starts to be displayed to be displayed on the reference portion indication region.

3. The data generation system according to claim 2, wherein the information presenting device displays a connecting line which is provided for each operation indication mark corresponding to each reference timing assigned for each reference portion on the reference portion indication region, and connects reference timings with each other such that a reference timing positioned at a starting point corresponds to information representing a display start timing and a reference portion to which the reference timing is assigned corresponds to information representing a reference portion that starts to be displayed, as the display start position information and the display start timing information.

4. The data generation system according to claim 3, wherein the information presenting device causes the connecting line to be displayed in a color that differs according to a reference portion to which an operation timing serving as a starting point is assigned based on the display start position information.

5. The data generation system according to claim 1, wherein the sequence data is described such that an operation timing of each of a series of operations on a plurality of operating units described as the reference timing is associated with information designating any one of the plurality of operating units, and used as a data indicating the operation timing and each operating unit in the game in which a region in which each reference portion corresponding to each of the plurality of operating units among the plurality of reference portions is set as an operation reference portion is used as the game region, the editing area presenting device causes information of all operation timings respectively corresponding to the plurality of operating units to be displayed on the timing information display region in time series, and causes each operation timing assigned to each of the plurality of operating units to be displayed on the reference portion indication region in time series for each operation reference portion, and the information presenting device causes information in which information of an operation indication mark corresponding to each operation timing assigned for each operation reference portion is associated with information of each operation reference portion in which each operation indication mark starts to be displayed to be displayed on the reference portion indication region as the display start position information.

6. The data generation system according to claim 1, further comprising an assignment device that assigns information of all reference timings displayed on the timing information display region for each reference portion of the reference portion indication region.

7. The data generation system according to claim 1, wherein a reference timing setting device that sets a mark timing based on information input to the operation input unit, calculates a timing at which an operation has been executed on the operation input unit as an elapsed timing from the mark timing, and sets the calculated elapsed timing as the reference timing is provided as one of editing devices.

8. The data generation system according to claim 1, wherein an information determining device that determines at least one of information of each reference timing displayed on the editing screen based on information input to the operation input unit is provided as one of the editing devices.

9. The data generation system according to claim 8, wherein a reference portion information adding device that adds information of a reference portion corresponding to any one of the plurality of reference portions to information of the reference timing determined by the information determining device is provided as one of editing devices.

10. The data generation system according to claim 8, wherein an timing information adding device that adds information of one of two reference timings determined by the information determining device to information of the other reference timing based on information input to the operation input unit is provided as one of editing devices.

11. The data generation system according to claim 1, further comprising a grouping device that performs grouping by specifying one of reference timings and a next reference timing next to the one reference timing in which a time interval between the one reference timing and the next reference timing is less than a predetermined value, and adding common information to the specified one reference timing and the next reference timing.

12. The data generation system according to claim 1, further comprising a generating device that generates the sequence data based on information to be displayed on the reference portion indication region.

13. A data generation method for controlling a computer incorporated into a data generation system generating sequence data, in which a reference timing in a game is described, which is used by being referred to by a computer as information indicating the reference timing of a game in which an operation indication mark displayed for indicating an operation on at least one operating unit to be operated by a player moves so as to arrive at least one of a plurality of reference portions at the reference timing in a game region in which the plurality of reference portions are arranged apart from each other, wherein the data generation system comprises a display unit that displays an editing screen, an operation input unit that receives a user's operation, an editing device that edits information to be displayed on the editing screen based on information of an operation on the operation input unit, a control unit coupled to the display unit, the control unit including a stored device that stores the information indicating the reference timing of the game, an editing area presenting device, and an information presenting device, and the data generation method comprises the steps:

an editing area presenting step, by the editing area presenting device, that causes a timing information display region displaying information of all reference timings in time series and a reference portion indication region displaying reference timings assigned to at least one of the plurality of reference portions among the all reference timings in time series for each reference portion to be displayed on the editing screen; and an information presenting step, by the information presenting device, that causes display start position information in which information of an operation indication mark corresponding to each reference timing assigned for each reference portion is associated with information of each reference portion in which each operation indication mark starts to be displayed on the reference portion indication region.

14. A non-transitory storage medium storing a computer program for a data generation system generating sequence data, in which a reference timing in a game is described, which is used by being referred to by a computer as information indicating the reference timing of a game in which an operation indication mark displayed for indicating an operation on at least one operating unit to be operated by a player moves so as to arrive at least one of a plurality of reference portions at the reference timing in a game region in which the plurality of reference portions are arranged apart from each other, wherein the data generation system comprises a display unit that displays an editing screen an operation input unit that receives a user's operation, an editing device that edits information to be displayed on the editing screen based on information of an operation on the operation input unit, and a control unit coupled to the display unit, the control unit including a storage device that stores the information indicating the reference timing of the game, and the computer program for the data generation system is configured so as to cause the control unit to function as:

an editing area presenting device that causes a timing information display region displaying information of all reference timings in time series and a reference portion indication region displaying reference timings assigned to at least one of the plurality of reference portions among the all reference timings in time series for each reference portion to be displayed on the editing screen; and an information presenting device that causes display start position information in which information of an operation indication mark corresponding to each reference timing assigned for each reference portion is associated with information of each reference portion in which each operation indication mark starts to be displayed on the reference portion indication region.

\* \* \* \* \*